United States Patent
Aoyama et al.

(10) Patent No.: US 9,000,626 B2
(45) Date of Patent: Apr. 7, 2015

(54) THRUST GENERATION MECHANISM, DRIVE DEVICE, XY STAGE AND XYZ STAGE

(75) Inventors: Yasuaki Aoyama, Hitachinaka (JP); Yoshitaka Iwaji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 555 days.

(21) Appl. No.: 13/133,966

(22) PCT Filed: Dec. 10, 2009

(86) PCT No.: PCT/JP2009/070667
§ 371 (c)(1),
(2), (4) Date: Jun. 10, 2011

(87) PCT Pub. No.: WO2010/067837
PCT Pub. Date: Jun. 17, 2010

(65) Prior Publication Data
US 2011/0241449 A1    Oct. 6, 2011

(30) Foreign Application Priority Data

Dec. 10, 2008  (JP) .................................. 2008-313846
Mar. 31, 2009  (JP) .................................. 2009-083979

(51) Int. Cl.
H02K 41/03    (2006.01)
H02P 23/00    (2006.01)
H02P 25/06    (2006.01)

(52) U.S. Cl.
CPC .............. H02K 41/03 (2013.01); H02P 23/005 (2013.01); H02P 25/06 (2013.01)

(58) Field of Classification Search
USPC ........... 310/12.05, 12.24, 12.25, 12.13, 12.15
See application file for complete search history.

(56) References Cited

U.S. PATENT DOCUMENTS 4,528,533 A * 7/1985 Montagu ........................ 335/230
4,945,268 A * 7/1990 Nihei et al. .................. 310/12.22
(Continued)

FOREIGN PATENT DOCUMENTS

| JP | 2-246761 | 10/1990 |
| JP | 4-276363 | 10/1992 |

(Continued)

OTHER PUBLICATIONS

Office Action issued in Japanese Patent Application No. 2012-252836 on Jul. 8, 2014.

*Primary Examiner* — Dang Le

(74) *Attorney, Agent, or Firm* — Baker Botts L.L.P.

(57) ABSTRACT

A thrust generation mechanism includes magnetic pole teeth which are arranged so as to sandwich and hold permanent magnets disposed on movers, cores which serially connect the magnetic pole teeth which sandwich and hold the magnets, armature winding wires which are collectively wound around the cores, and the movers having the magnets arranged such that the different magnetic poles thereof alternately face the front side and the rear side. The magnetic pole teeth which are arranged so as to sandwich and hold the permanent magnets and the armature iron cores which have cores serially connecting the magnetic pole teeth which hold the magnets are arranged in the longitudinal direction of the movers, and armature iron cores have a common winding wire. A stage is provided with a small-sized lightweight drive device which comprises magnetic pole teeth which are arranged on both sides of each permanent magnet with gaps therebetween, cores which connect the magnetic pole teeth, armatures which have armature winding wires wound around the magnetic pole teeth, and a row of the permanent magnets which is arranged such that the different magnetic poles are arranged alternately. The small-sized lightweight drive device is configured so that the number of the magnetic poles of the armatures is changed according to a thrust pattern required by the drive device.

18 Claims, 30 Drawing Sheets

(56) References Cited

U.S. PATENT DOCUMENTS

| | | | |
|---|---|---|---|
| 6,548,919 B2 * | 4/2003 | Maki et al. | 310/12.21 |
| 6,753,627 B2 * | 6/2004 | Kim et al. | 310/12.24 |
| 6,825,581 B1 | 11/2004 | Joong et al. | |
| 6,849,969 B2 * | 2/2005 | Kang et al. | 310/12.25 |
| 6,856,050 B2 * | 2/2005 | Flechon | 310/12.26 |
| 6,876,108 B2 * | 4/2005 | Maki et al. | 310/12.24 |
| 7,989,991 B2 * | 8/2011 | Gruendl et al. | 310/12.04 |
| 2002/0050804 A1 | 5/2002 | Joong et al. | |
| 2008/0284259 A1 * | 11/2008 | Grundl et al. | 310/28 |

FOREIGN PATENT DOCUMENTS

| | | |
|---|---|---|
| JP | 09-047008 | 2/1997 |
| JP | 10-174418 | 6/1998 |
| JP | 2001-028875 | 1/2001 |
| JP | 2002-142438 | 5/2002 |
| JP | 2005-051869 | 2/2005 |
| JP | 2005-065425 | 3/2005 |
| JP | 2005-287185 | 10/2005 |
| JP | 2007-020270 | 1/2007 |

* cited by examiner

DIRECTION OF MAGNETIC FLUX GENERATED BY COIL

MAGNETIC FLUX OF MAGNET

THRUST

FIG.18A  FIG.18B
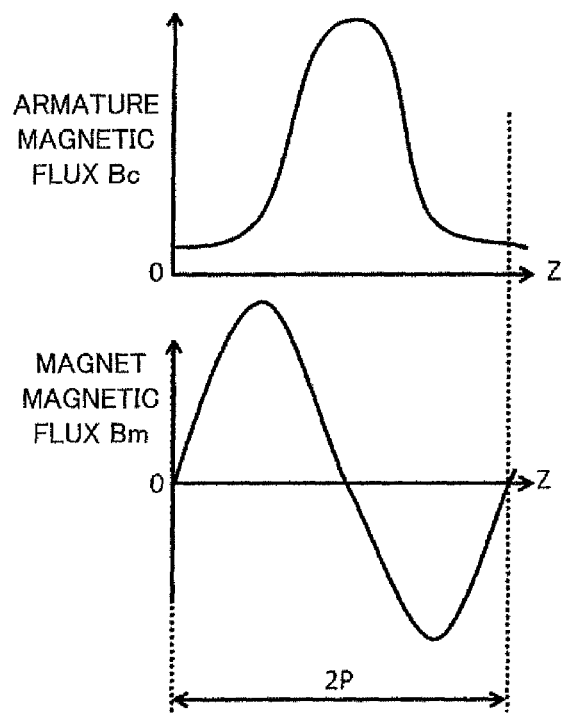
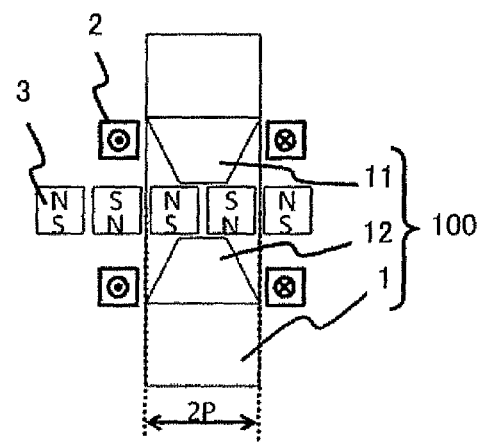
FIG.19
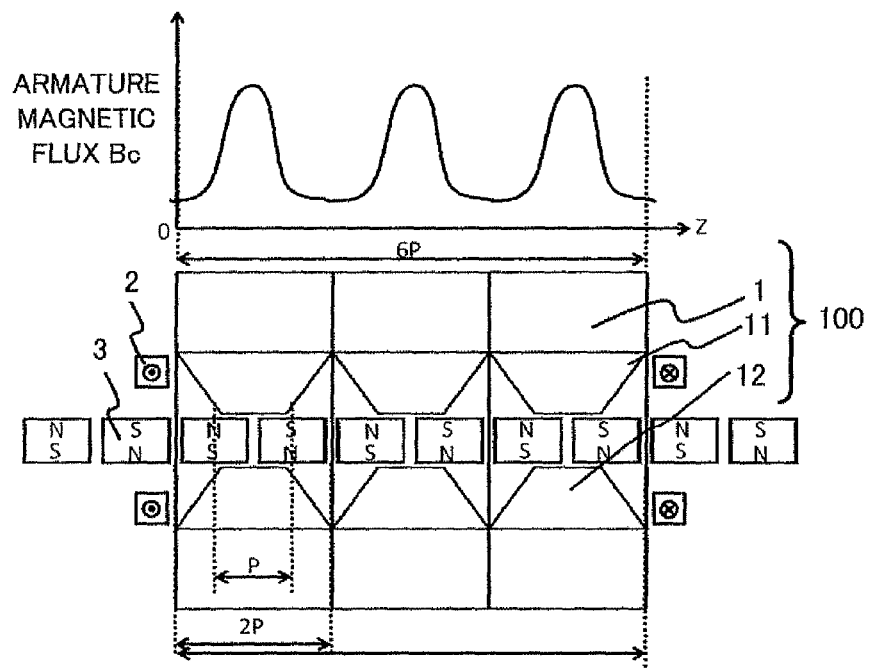

FIG.20A
FIG.20B
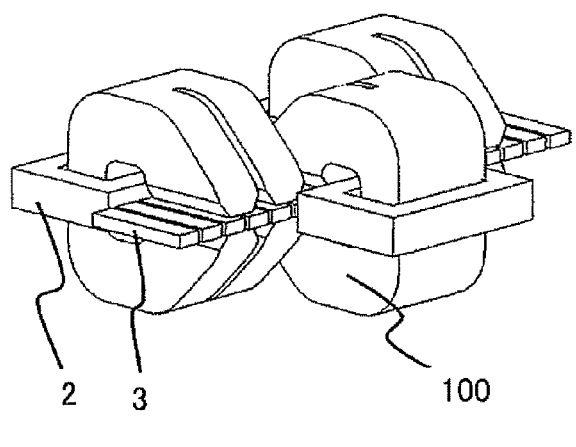
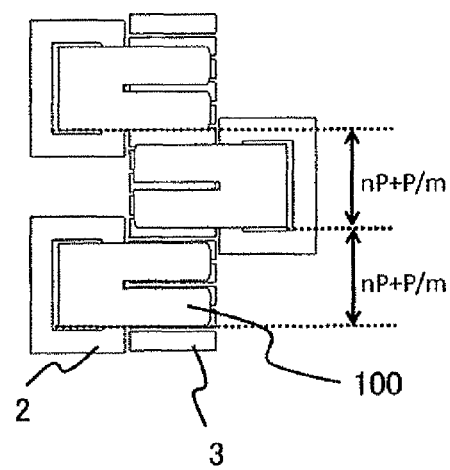
FIG.21A
FIG.21B
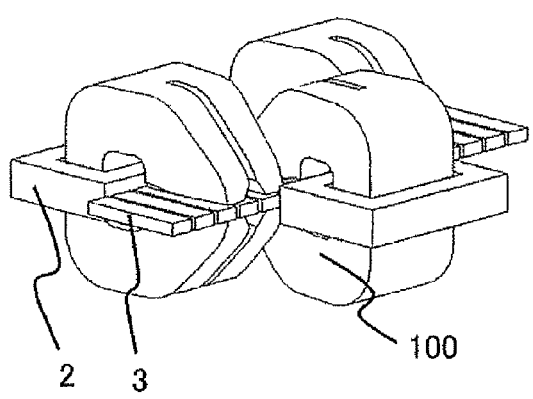
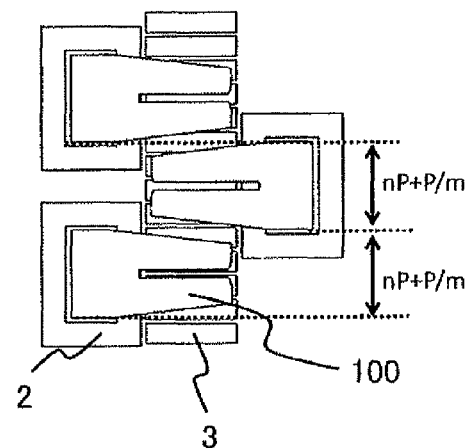

THRUST GENERATION MECHANISM, DRIVE DEVICE, XY STAGE AND XYZ STAGE

RELATED APPLICATIONS

This application is a nationalization under 35 U.S.C. 371 of PCT/JP2009/070667, filed Dec. 10, 2009 and published as WO 2010/067837 A1 on Jun. 17, 2010, which claimed priority under U.S.C. 119 to Japanese Application No. 2008-313846, filed Dec. 10, 2008 and Japanese Application No. 2009-083979, filed Mar. 31, 2009, which applications and publication are incorporated herein by reference and made a part hereof.

TECHNICAL FIELD

The present invention relates to a structure that generates a thrust, and more specifically, to a highly efficient thrust generation mechanism that reduces leakage fluxes by making the directions of magnetic fluxes to be the same, a drive device that utilizes an electromagnetic force, and an XY stage and an XYZ stage which use the drive device as a drive source and which are used in a semiconductor manufacturing device and an industrial machine.

BACKGROUND ART

A linear motor having a conventional thrust generation mechanism is in a configuration obtained by opening up a rotating machine, and a large attraction force acts between a mover including a magnet array and an armature. Patent Document 1 discloses a linear motor that has a magnetic pole with a first polarity and a magnetic pole with a second polarity which are alternately arranged in order to cancel a magnetic attraction force. According to the related art, as shown in FIG. 1 of Patent Document 1, the same armature winding is arranged on an armature core, and magnetic fluxes generated by allowing a current to flow through the armature winding pass through a magnetic pole, so that magnetic polarities in the same direction are generated at the upper and bottom sides of the magnet. In contrast, a magnetic polarity in the opposite direction is generated at the adjacent magnetic pole. Accordingly, an armature winding can generate alternate magnetic polarities between a gap. When permanent magnets are arranged in a gap so that respective magnetic polarities are alternate to each other, a force acts on the permanent magnets by allowing a current to flow through the armature winding.

Also, a conventional stage utilizes a drive device that has cylindrical actuators or polar teeth which are arranged alternately as a drive source. Patent Document 2 discloses a table in which polar teeth are combined alternately with the same winding. Patent Document 3 discloses a table that uses a drive device having a first opposing portion and a second opposing portion whose polarities are different.

PRIOR ART DOCUMENTS

Patent Documents

Patent Document 1: JP 2001-028875 A
Patent Document 2: JP 2002-142438 A
Patent Document 3: JP 2005-051869 A

DISCLOSURE OF INVENTION

Problems to be Solved by the Invention

According to the related art, since alternate magnetic polarities are generated by the armature winding via the magnetic pole and the armature core, the path of magnetic fluxes generated by the armature winding is long, the magnetic efficiency is reduced, and the weight increases in proportion to the length of the path.

Also, since adjacent magnetic poles have different magnetic polarities, a magnetic flux in the gap direction and a magnetic flux between the magnets are generated. The magnetic flux generated between the adjacent magnets is a non-linkage flux to the magnet, and is a useless magnetic flux which does not contribute to a force. Hence, the magnetism utilization ratio of a magnetic circuit is low. Furthermore, since magnetic fluxes in reverse directions are generated by the adjacent magnetic poles, the armature core becomes complex, and it is necessary to arrange the armature winding at a location which is apart from a portion where the magnets face with each other.

Also, a conventional drive device of an XYZ stage has a large leakage flux, and thus is large and heavy. For this reason, since the drive device is heavy in weight, a deformation by its own weight occurs. As a result, a precision is reduced and an installation place is limited.

The present invention has been made in order to overcome the above-explained problems, and it is an object of the present invention to provide a structure that is capable of generating a high thrust.

Also, it is another object of the present invention to provide a drive device that is compact and light-weighted, and an XY stage or an XYZ stage which uses the compact and light-weighted drive device and has highly precise and highly responsive.

Means for Solving the Problems

In order to achieve the above objects, the present invention provides a thrust generation mechanism that includes an armature and a mover movable relative to each other, the armature including an armature core and a winding and the mover including a permanent magnet, in which the armature core includes polar teeth that are arranged at respective magnetic polarity sides of the permanent magnet so as to face each other via a gap, and a core that connects the polar teeth, and the armature includes a plurality of the armature cores and the plurality of the armature cores have a same polarity.

Also, in order to achieve the above objects, a present invention provides a thrust generation mechanism that includes an armature and a mover movable relative to each other, the armature including an armature core and a winding and the mover including a permanent magnet, in which the armature includes a plurality of the armature cores, the armature core includes polar teeth arranged at respective magnetic polarity sides of the permanent magnet so as to face each other via a gap, and a core that connects the polar teeth, and the plurality of armature cores have a same polarity with a pitch of the plurality of armature cores being 2nP (n is an integer where n=1, 2, 3, . . . ) when a pitch of magnetic poles of the mover is P.

Also, in order to achieve the above objects, the present invention provides a thrust generation mechanism that includes an armature and a mover movable relative to each other, the armature including an armature core and a winding and the mover including a permanent magnet, in which the armature includes a plurality of the armature cores, the armature core includes polar teeth arranged at respective magnetic polarity sides of the permanent magnet so as to face each other via a gap, and a core that connects the polar teeth, and the plurality of armature cores have a same polarity with a pitch of the plurality of armature cores being 2nP±P/2m (n is an integer where n=1, 2, 3, . . . , and m is a number of phases where m=1, 2, 3, . . . ) when a pitch of magnetic poles of the mover is P.

Also, in order to achieve the above objects, the present invention provides a thrust generation mechanism that includes an armature and a mover movable relative to each other, the armature including an armature core and a winding and the mover including a permanent magnet, in which the armature core includes polar teeth arranged at respective magnetic polarity sides of the permanent magnet so as to face each other via a gap, and a core that connects the polar teeth, and the armature includes a plurality of the armature cores, and respective magnetic fluxes by adjacent armature cores are directed in a same direction.

Also, in order to achieve the above objects, the present invention provides a thrust generation mechanism that includes an armature and a mover movable relative to each other, the armature including an armature core and a winding and the mover including a permanent magnet, in which the armature core includes polar teeth arranged at respective magnetic polarity sides of the permanent magnet so as to face each other via a gap, and a core that connects the polar teeth, the armature includes a plurality of the armature cores, the plurality of armature cores have a same polarity, and a thickness t of the armature core in the mover lengthwise direction is $P \leq t$ when a pitch of magnetic poles of the mover is P, and the plurality of armature cores have a same polarity.

Also, in order to achieve the above objects, the present invention provides a thrust generation mechanism that includes an armature and a mover movable relative to each other, the armature including an armature core and a winding and the mover including a permanent magnet, in which the armature core includes polar teeth arranged at respective magnetic polarity sides of the permanent magnet so as to face each other via a gap, and a core that connects the polar teeth, and the core arranged in a facing manner in the gap having a range of 2P when a pitch of the magnetic poles of the mover is P generates magnetic fluxes in a same direction against an arbitrary current supplied to the winding.

Also, in order to achieve the above objects, the present invention provides a thrust generation mechanism that includes an armature and a mover movable relative to each other, the armature including an armature core and a winding and the mover including a permanent magnet, in which the armature core includes polar teeth arranged at respective magnetic polarity sides of the permanent magnet so as to face each other via a gap, and a core that connects the polar teeth, and a plurality of the armature cores generate magnetic fluxes in a same direction relative to the gap against an arbitrary current supplied to the winding.

Also, in order to achieve the above objects, the present invention provides a thrust generation mechanism that includes an armature and a mover movable relative to each other, the armature including an armature core and a winding and the mover including a permanent magnet, in which the armature core includes polar teeth arranged at respective magnetic polarity sides of the permanent magnet so as to face each other via a gap, and a core that connects the polar teeth, and the number of polarities generated by the armature in the gap against an arbitrary current supplied to the winding is one relative to a magnet array having two polarities with a pitch of the magnetic poles being P.

In the above-explained thrust generation mechanism of the present invention, a winding is commonly wound around the plurality of armature cores.

In the above-explained thrust generation mechanism, armature windings are arranged around the polar teeth arranged at respective magnetic polarity sides of the permanent magnet so as to face each other.

In the above-explained thrust generation mechanism, the polar teeth arranged at respective magnetic polarity sides of the permanent magnet so as to face each other are tapered toward the magnet.

In the above-explained thrust generation mechanism, the polar teeth arranged at respective magnetic polarity sides of the permanent magnet so as to face each other are shaped so that a plane facing the magnet is cut out.

According to the thrust generation mechanism of the present invention, a unit including a plurality of the armatures is taken as a phase, and the thrust generation mechanism is driven in a plurality of phases, and a pitch of respective phases that are the plurality of adjacent armatures is set to be (nP+P/m) (where n=0, 1, 2, 3, . . . , and m is a number of phases where m=1, 2, 3, . . . ) when a pitch of the magnetic poles is P.

Also, the present invention provides a linear motor including the above-explained thrust generation mechanism of the present invention.

Also, the present invention provides a stage configured by a compact and light-weighted drive device that includes an armature having polar teeth arranged at both sides of a permanent magnet via a gap, a core that connects those polar teeth, and armature windings wound around the plurality of polar teeth, and a permanent magnet array arranged so that magnetic polarities are alternate.

Furthermore, by changing the number of magnetic poles of the armature in accordance with a necessary thrust pattern for the drive device, the drive device can be compact and light-weighted.

Effect of the Invention

According to the present invention, it becomes possible to provide a thrust generation mechanism which reduces the leakage flux and which is thus highly efficient.

Also, according to the present invention, it becomes also possible to provide a linear motor that uses a highly efficient thrust generation mechanism.

Also, according to the present invention, a compact and light-weighted drive device can be configured, so that the weight of the drive device can be reduced, and thus it becomes possible to provide an XY stage or an XYZ stage that is highly precise and highly responsive.

BRIEF DESCRIPTION OF DRAWINGS

FIG. 18A shows a distribution of magnetic fluxes generated by a magnet and magnetic fluxes generated by an armature;

FIG. 18B is a cross-sectional view of a solo armature unit;

FIG. 19 shows a distribution of magnetic fluxes when a plurality of armature units are arranged side by side;

FIG. 20A is a perspective view that shows an embodiment in which armature units are alternately arranged;

FIG. 20B is a top view that shows the embodiment in which the armature units are alternately arranged;

FIG. 21A is a perspective view showing an embodiment in which an armature core is in a triangular shape;

FIG. 21B is a top view showing the embodiment in which the armature core is in a triangular shape;

BEST MODE FOR CARRYING OUT THE INVENTION

First Embodiment

Embodiments of the present invention will be explained below with reference to the accompanying drawings.

Figure 1:
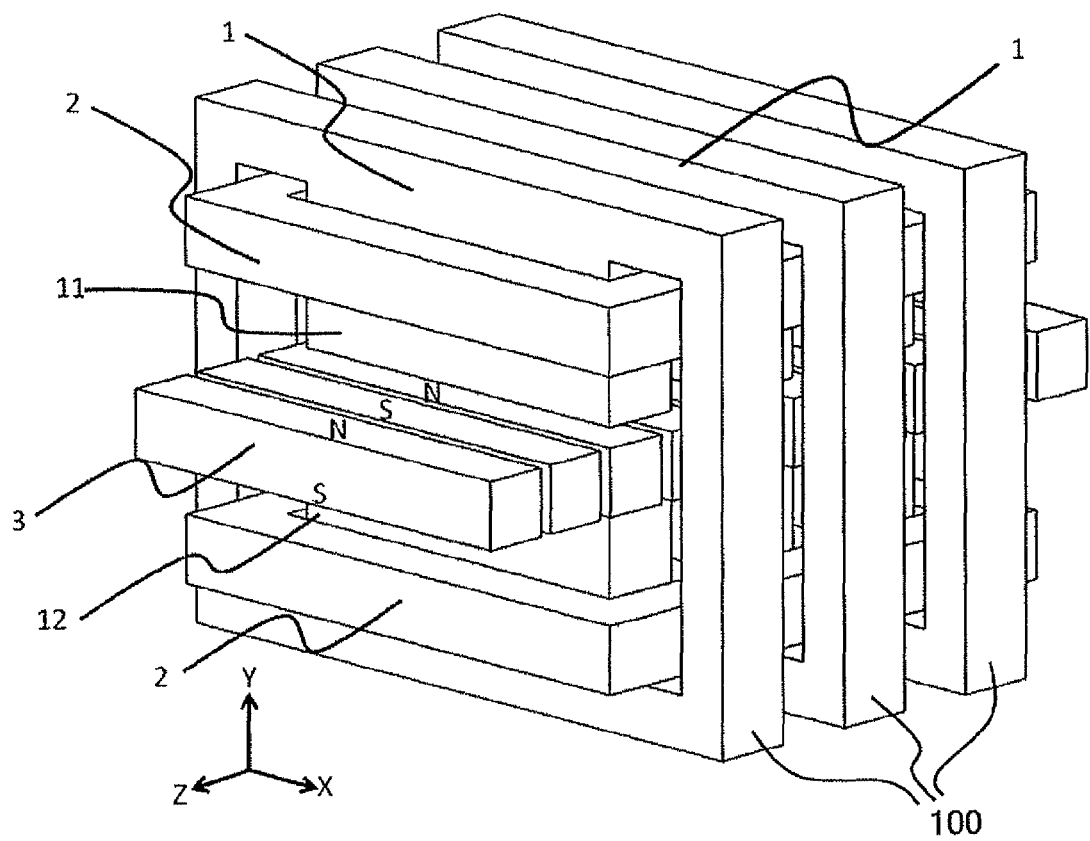
FIG. 1 shows a thrust generation mechanism according to an embodiment of the present invention.
Figure 2:
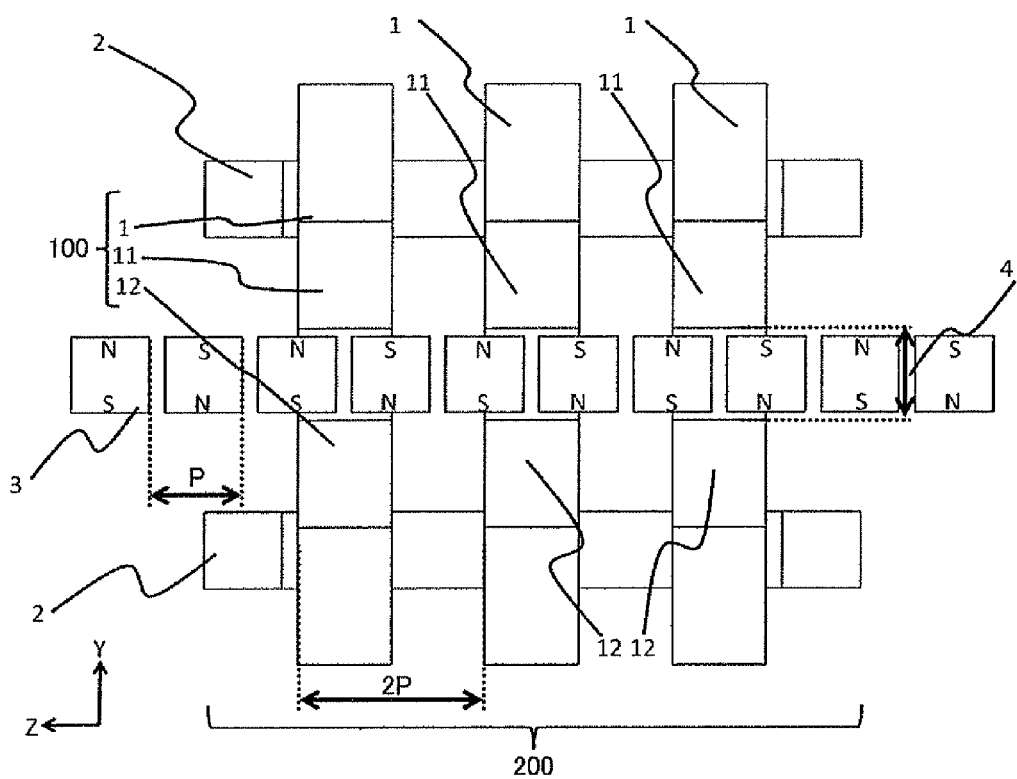
FIG. 2 is a cross-sectional view showing an YZ plane of the thrust generation mechanism shown in FIG. 1.
Figure 3:
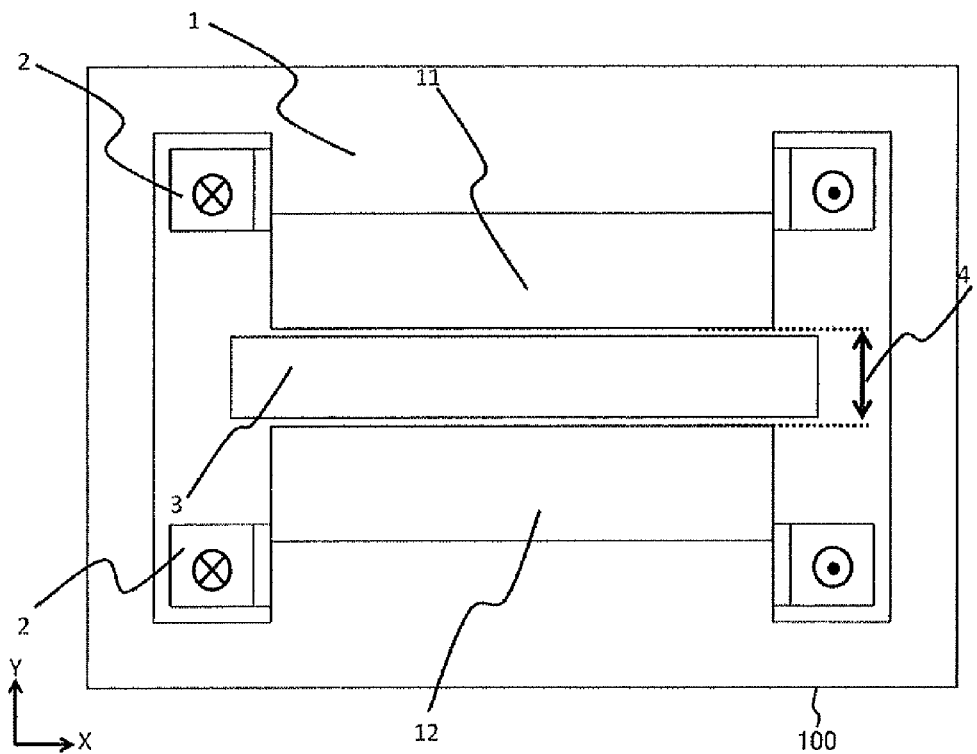
FIG. 3 is a cross-sectional view showing an XY plane of the thrust generation mechanism shown in FIG. 1.

FIG. 1 shows a thrust generation mechanism according to an embodiment of the present invention. FIG. 2 is a cross-sectional view along an YZ plane of the thrust generation mechanism, and FIG. 3 is a cross-sectional view along an XY plane thereof. As shown in FIGS. 1 to 3, armature core units 100 each include an upper polar tooth 11 facing a magnet, a lower polar tooth 12 facing the magnet, and an armature core 1 that connects the upper polar tooth 11 and the lower polar tooth 12. The upper polar tooth 11 and the lower polar tooth 12 are arranged so as to face each other via a gap 4 therebetween, and a magnet array 3 is inserted into the gap 4. The magnet array 3 has rectangular magnets arranged at a pitch P so that a surface facing the polar tooth serves as a pole face and the magnetic polarity alternates between adjacent magnets. Also, the armature core formed in the same shape as the armature core unit 100 is arranged at a pitch 2P against the armature core unit 100 relative to the pitch P of the magnet.

An armature unit 200 employs a structure in which armature windings 2 are arranged so as to be shared by a plurality of armature core units 100. Also, the armature unit has the same armature winding wound around a plurality of armature cores, and the number of armature cores is not limited to any particular number, and a structure can be employed in which an armature winding is wound around the whole armature cores.

Figure 4:
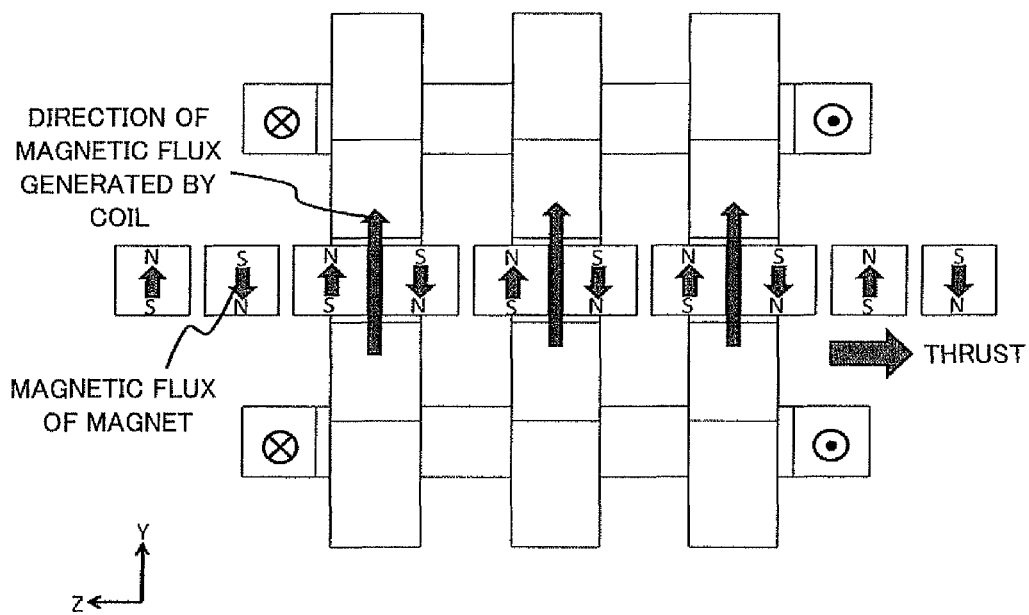
FIG. 4 shows magnetic fluxes of an armature core of the thrust generation mechanism shown in FIG. 1.

According to the above-explained structure, when a current is supplied to the armature cores 2, magnetic fluxes are generated at the gap 4. A force that acts on the magnet array is generated by the magnetic fluxes and the mutual action of the magnetic fluxes of the magnets. FIG. 4 shows the magnetic fluxes of the armature core. On the other hand, adjacent armature cores also generate magnetic fluxes in the same direction. At this time, the directions of the magnetic fluxes by the adjacent armature cores are substantially same, so that the leakage flux between the armature cores can be reduced.

Figures 5A, 5B:
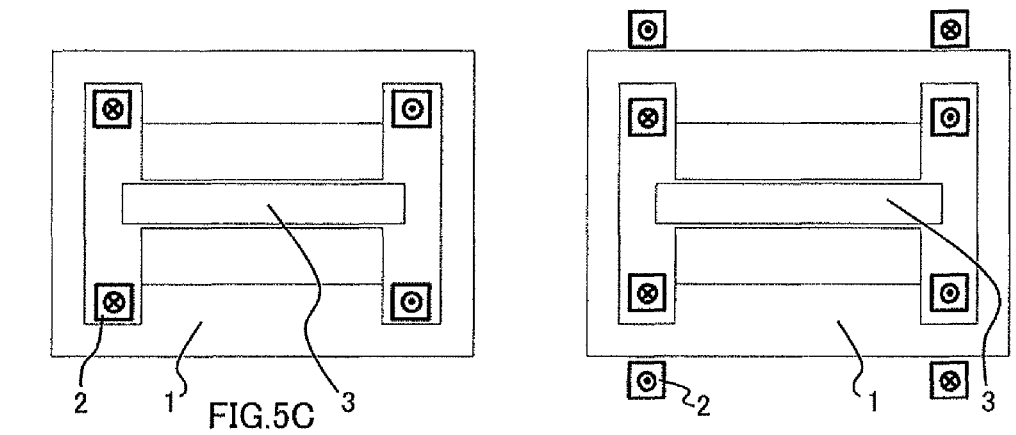
FIG. 5A shows an illustrative arrangement of an armature winding of the thrust generation mechanism shown in FIG. 1.
FIG. 5B shows an illustrative arrangement of an armature winding of the thrust generation mechanism shown in FIG. 1.
Figure 5C:
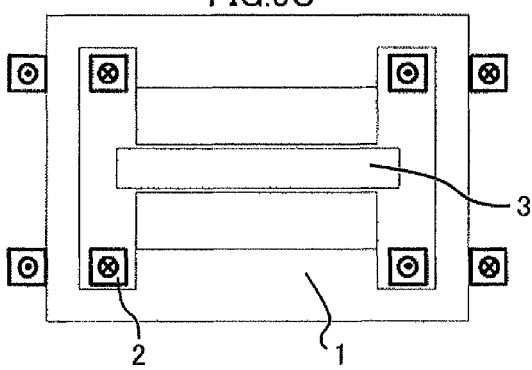
FIG. 5C shows an illustrative arrangement of an armature winding of the thrust generation mechanism shown in FIG. 1.

Also, since the directions of the magnetic fluxes by the plurality of armature cores are substantially same, the armature winding can be arranged regardless of the position of the armature core. FIGS. 5A to 5C respectively show illustrative arrangements of an armature winding. Since the position of the armature winding is not limited to any specific position, the degree of freedom for arrangement of the armature winding increases. Hence, when a support mechanism and a cooling mechanism are necessary for a mover, such support mechanism and cooling mechanism for the mover can be arranged regardless of the position of the armature winding. Also, as shown in FIG. 5A, the directions of the magnetic fluxes by the polar teeth are also same, so that the armature winding can be arranged at a portion that faces a magnet, and thus a magnetic circuit configuration with a good magnetic flux utilization ratio is enabled.

Figure 6:
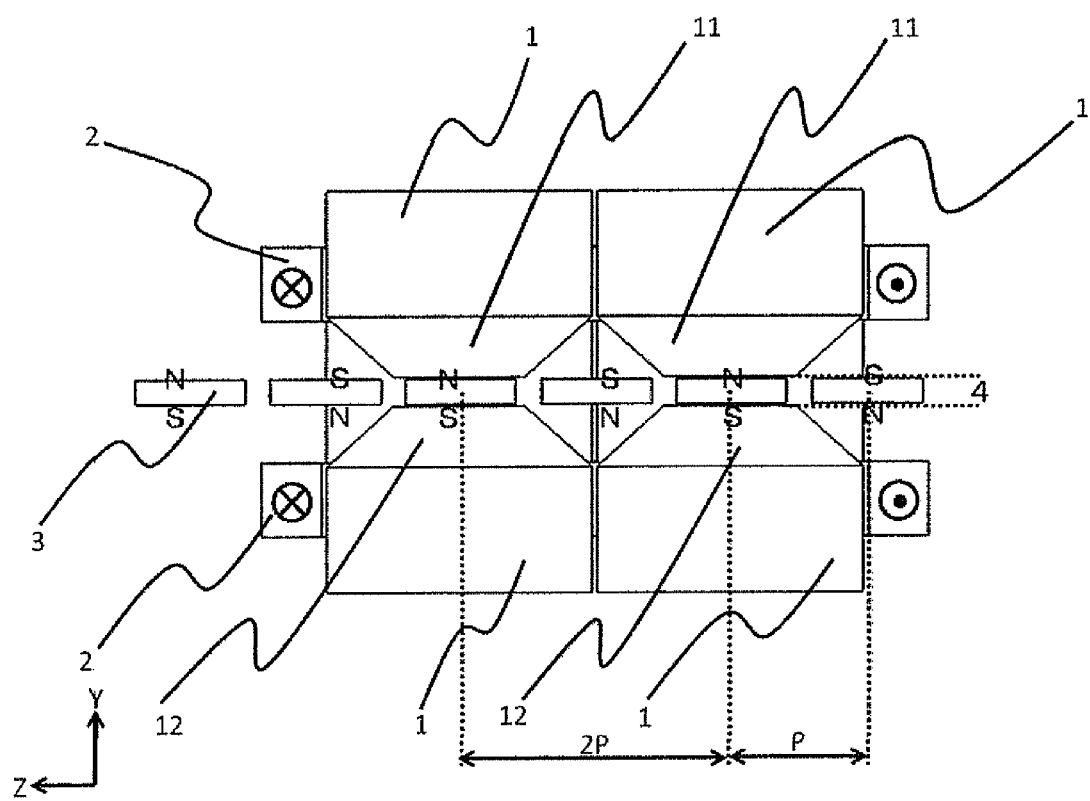
FIG. 6 shows an example case in which the clearance of the armature core of the thrust generation mechanism shown in FIG. 1 is reduced.

As shown in FIG. 6, since respective polarities of the armature cores are substantially same, a clearance between the armature cores can be reduced. In this case, when the upper polar tooth 11 and the lower polar tooth 12 are tapered toward the magnet, a thrust can be generated. In FIG. 6, the pitch of the plurality of armature cores is 2P, but may be 2nP. Also, when a clearance between armatures is eliminated, the directions of the magnetic fluxes by the plurality of armature cores are same, so that the same effect can be obtained.

Figure 7A:
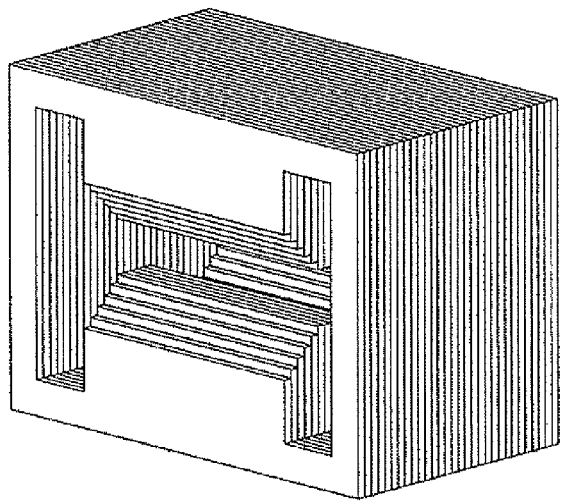
FIG. 7A shows an armature core of the thrust generation mechanism shown in FIG. 1 configured by stacked steel plates.
Figure 7B:
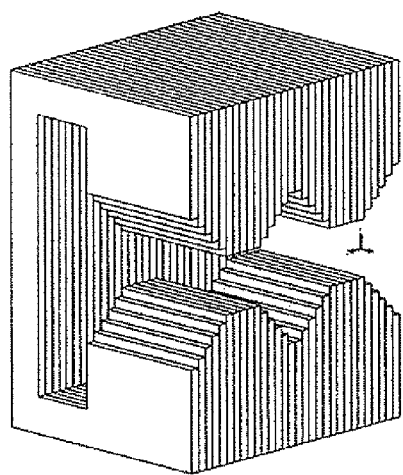
FIG. 7B shows an armature core of the thrust generation mechanism shown in FIG. 1 configured by stacked steel plates.
Figure 7C:
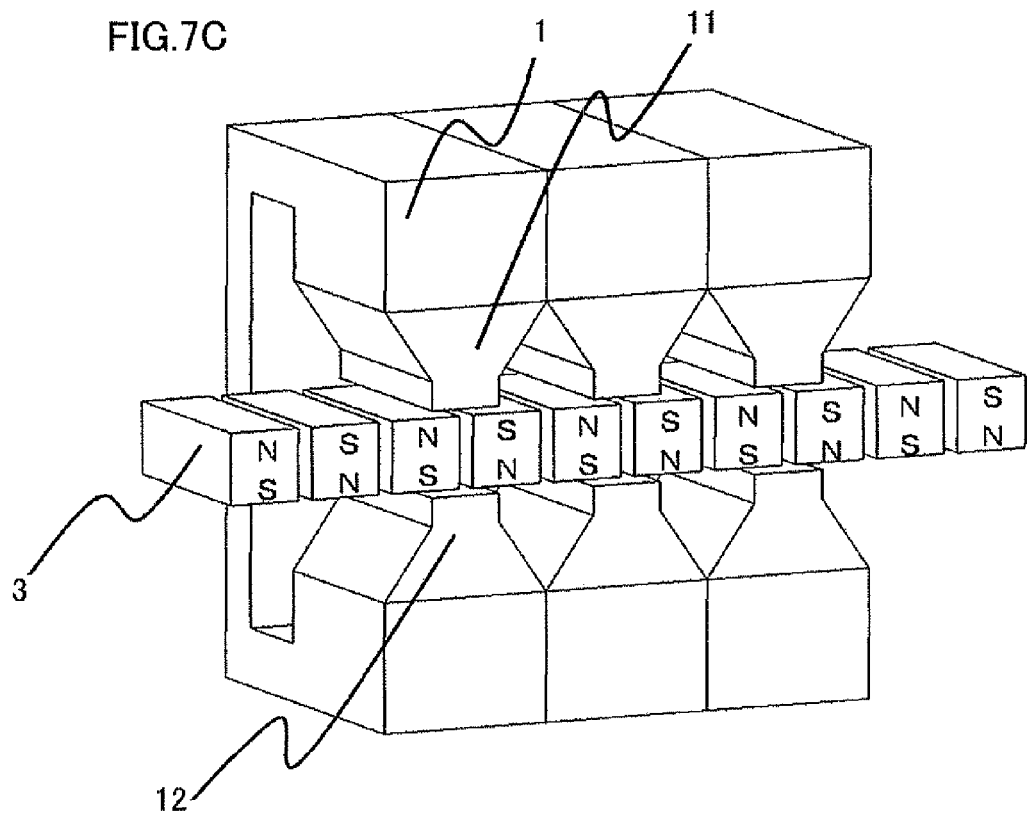
FIG. 7C shows an armature core of the thrust generation mechanism shown in FIG. 1 configured by stacked steel plates.

The armature core can be formed by stacking steel plates. FIG. 7A shows an armature core formed by stacked steel plates. FIG. 7B is a cross-sectional view showing a YZ plane of FIG. 7A. By changing the shape of a tip, the characteristic of a force to be generated can be changed. FIG. 7C shows an example in which the shape of a tip is changed.

Figure 8:
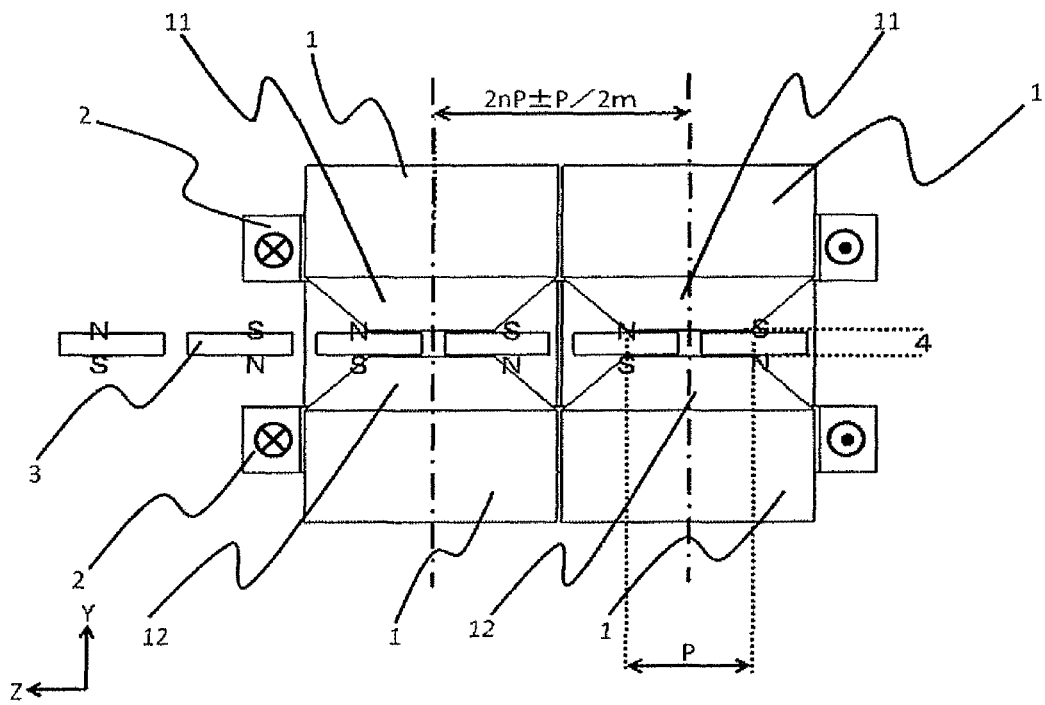
FIG. 8 shows a modified example of the pitch of a magnetic polarity of the thrust generation mechanism shown in FIG. 1.

Also, as shown in FIG. 8, when the pitch of the plurality armature core is set to be $2nP \pm P/2m$, by changing the pitch within the range $\pm P/2m$, pulsating components of a force (a torque) can be reduced. In this case, also, the same effect as that of the case shown in FIG. 1 can be obtained.

Figure 9:
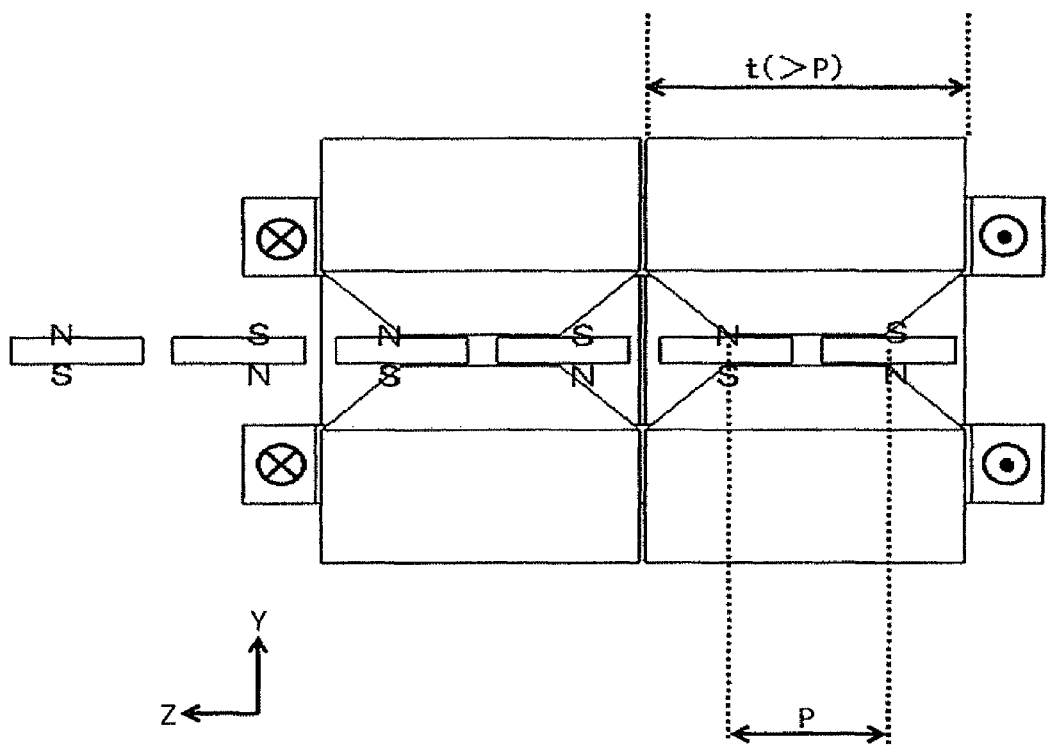
FIG. 9 shows an illustrative form of a polar tooth of the thrust generation mechanism shown in FIG. 1.

According to the thrust generation mechanism of the present invention, respective directions of the magnetic fluxes by the plurality of armature cores are substantially same, so that a distance between the adjacent armature cores can be reduced. When, relative to the pitch P of the magnet, the pitch of the armature core is set to be 2P, the thickness t of the armature core can be set to be $0 < t <= 2P$. At this time, by causing the polar tooth facing the magnet tapered toward the magnet, magnetic fluxes are concentrated, and a larger force can be obtained. FIG. 9 shows an illustrative shape of a polar tooth. The tapering also reduces the ripple of the magnetic fluxes, so that the ripple of the thrust can also be reduced.

Figure 10:
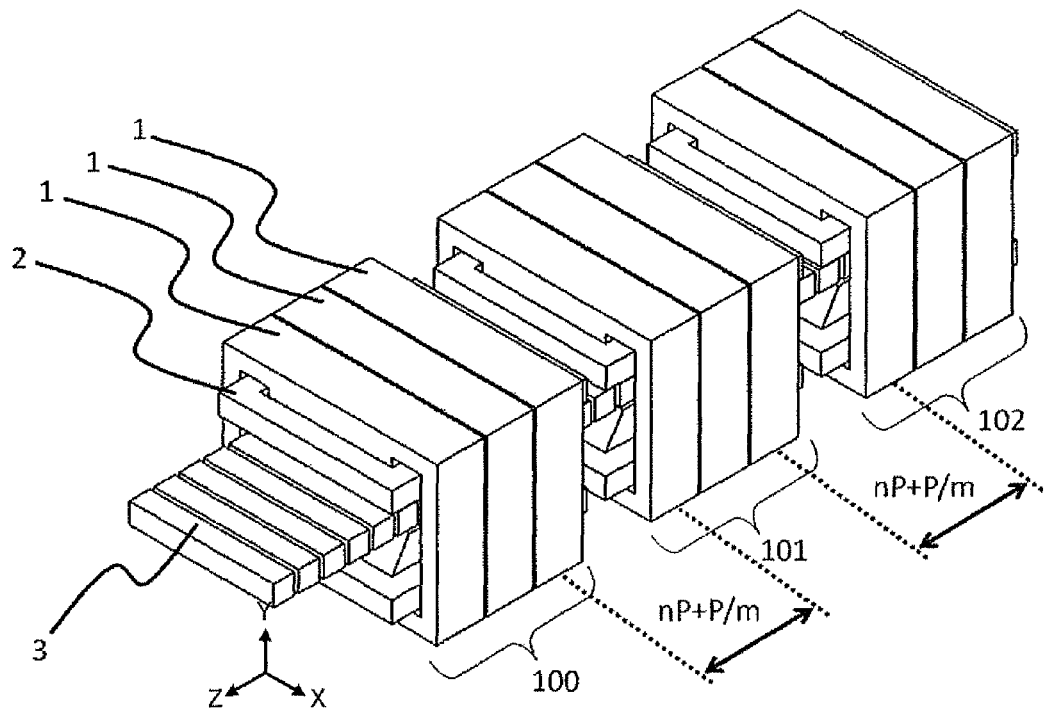
FIG. 10 shows an armature core unit of the thrust generation mechanism shown in FIG. 1 including three armature cores arranged side by side in parallel to one another.
Figure 11:
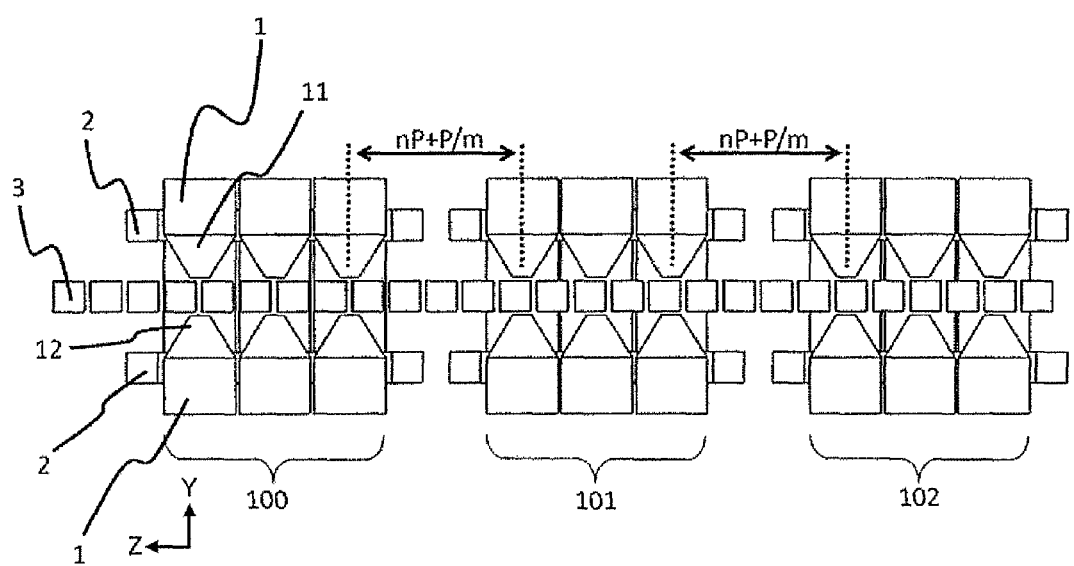
FIG. 11 is a cross-sectional view of FIG. 10.

An explanation will be given of a thrust generation apparatus that has armature units of the present invention arranged side by side in series or in parallel. FIG. 10 shows armature core units 100 each having three armature cores 1 arranged in parallel and armature windings 2 wound around a core that faces a magnet. FIG. 11 is a cross-sectional view of FIG. 10.

The positional relationship between an armature core unit 100 and an armature core unit 101 meets a condition in which adjacent cores of the armature core unit 100 and the armature core unit 101 are arranged at a clearance (nP+P/m) (where n=0, 1, 2, 3, . . . , and m=1, 2, 3, . . . ). In the embodiment shown in FIG. 10, three units configure a single structure which is a three-phase structure. The unit of each phase has a clearance which is between adjacent armatures and which is (nP+P/m).

The armature unit of the present invention can be configured if the clearance between the armature core unit 100 and the armature core unit 101 shown in FIGS. 10 and 11 is set to be (nP+2P/m) (where n=0, 1, 2, 3, . . . , and m=1, 2, 3, . . . ).

Second Embodiment

Figure 12:
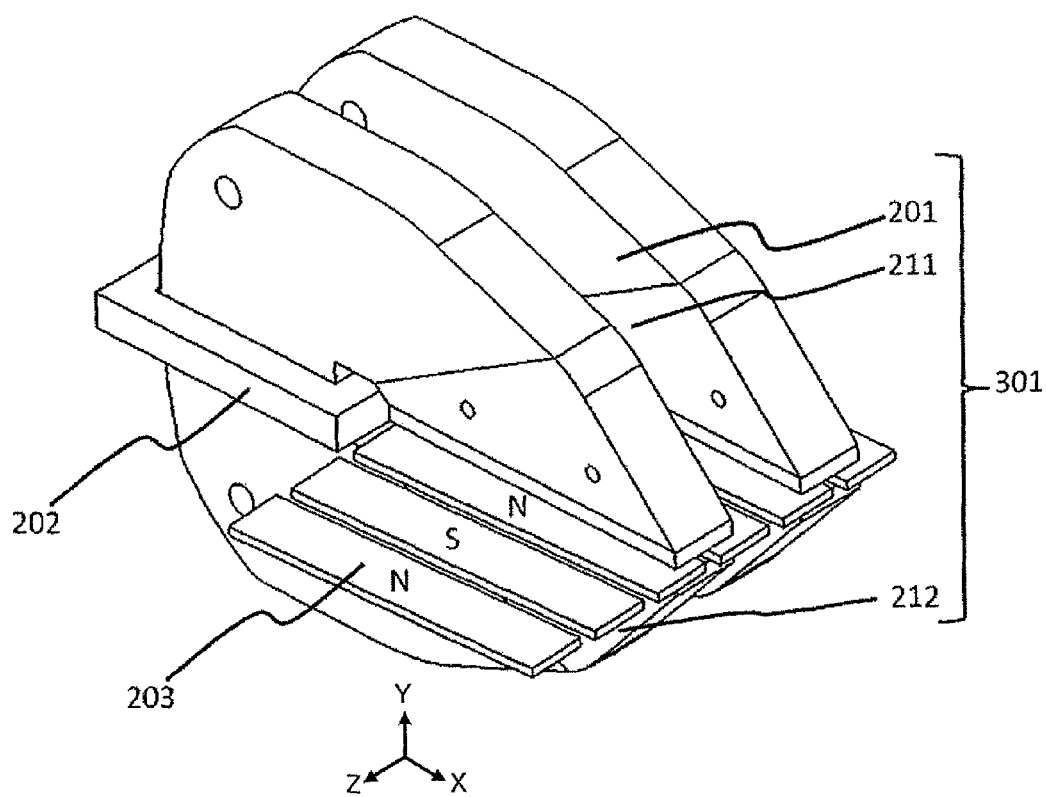
FIG. 12 shows another thrust generation mechanism according to another embodiment of the present invention.

Other embodiments of the present invention will be shown from FIG. 12 and followings.

The present invention employs a structure in which polar teeth are arranged so as to face respective upper and bottom faces of a magnet, and a core is used which connects the upper and lower polar teeth. A permanent magnet 203 is sandwiched between an upper polar tooth 211 and a lower polar tooth 212 with a gap therebetween. The upper polar tooth 211, the lower polar tooth 212, and a core 201 form a path of magnetic flux. A plurality of armature cores 301 each including the core 201, the upper polar tooth 211, and the lower polar tooth 212 are arranged side by side. A winding 202 that is common to the plurality of armature cores is arranged. Although the number of the armature cores shown in FIG. 12 is two, the similar configuration can be realized if the number of armature cores increases. The structure shown in FIG. 12 as a whole configures an armature unit.

Third Embodiment

Figure 13:
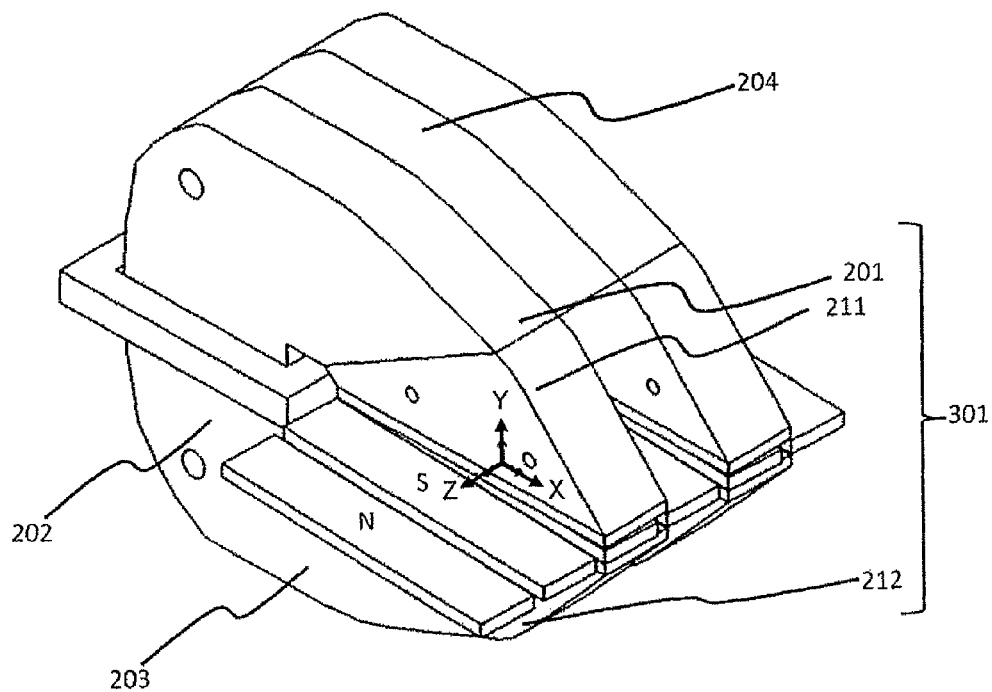
FIG. 13 shows an embodiment in which an auxiliary core is inserted among a plurality of armature cores.

Since the directions of the magnetic fluxes by the armature cores are substantially same, it is possible to insert an auxiliary core between a plurality of armature cores. FIG. 13 is an explanatory diagram for such a structure. A plurality of armature core units 301 each including the core 201, the upper polar tooth 211 and the lower polar tooth 212 are arranged side by side, and an auxiliary core 204 is inserted between the plurality of armature cores. This configuration increases the cross-sectional area of a core that is a path of magnetic flux.

Fourth Embodiment

Figure 14:
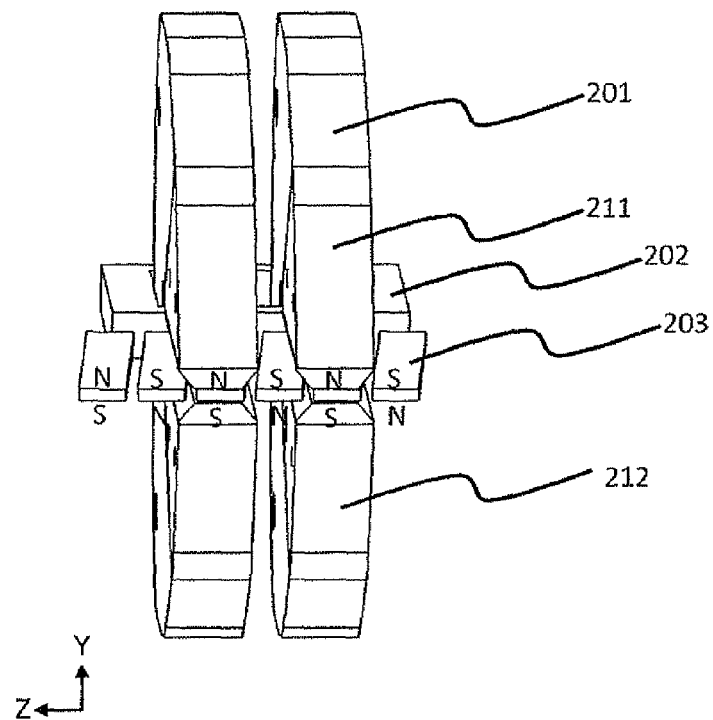
FIG. 14 shows an embodiment in which an upper polar tooth and a lower polar tooth are tapered toward a magnet.

As shown in FIG. 14, when the upper polar tooth and the lower polar tooth are tapered toward a magnet, the ripple of a force to be generated can be reduced. Also, when a magnet is inclined relative to the polar teeth, the ripple can be further reduced.

Fifth Embodiment

Figure 15:
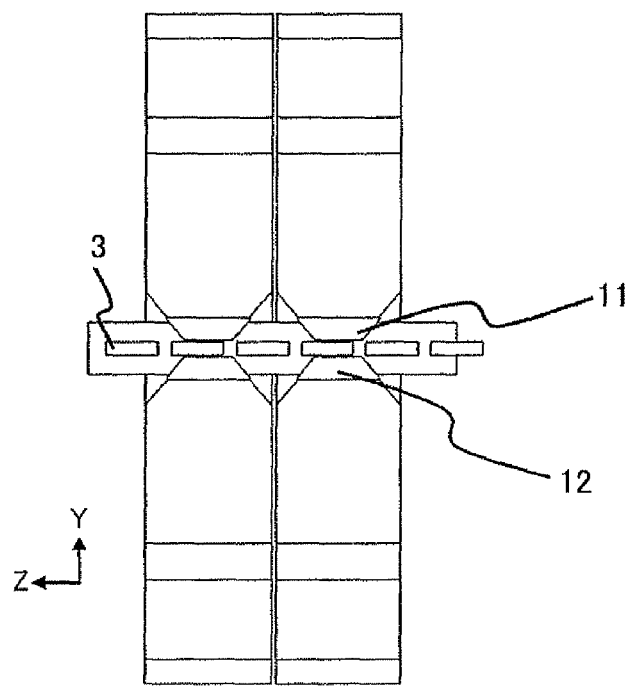
FIG. 15 shows an embodiment in which a clearance of an armature core is reduced.

As shown in FIG. 15, when the upper polar tooth and the lower polar tooth are tapered toward a magnet, the clearance between the armature cores can be reduced or the armature cores contact each other, resulting in a downsizing.

According to the structure of the second embodiment, one side of the magnet array is not covered by the armature core, so that another structural object can be arranged at that side of the magnet array. Also, like the first embodiment, a plurality of armature core units shown in FIG. 12 are arranged side by side at a clearance that is (nP+P/m) or (nP+2P/m) (where n=0, 1, 2, 3, . . . , and m=1, 2, 3, . . . ), so that a linear motor that can be driven by an m-phase power source is realized.

Sixth Embodiment

Figure 16:
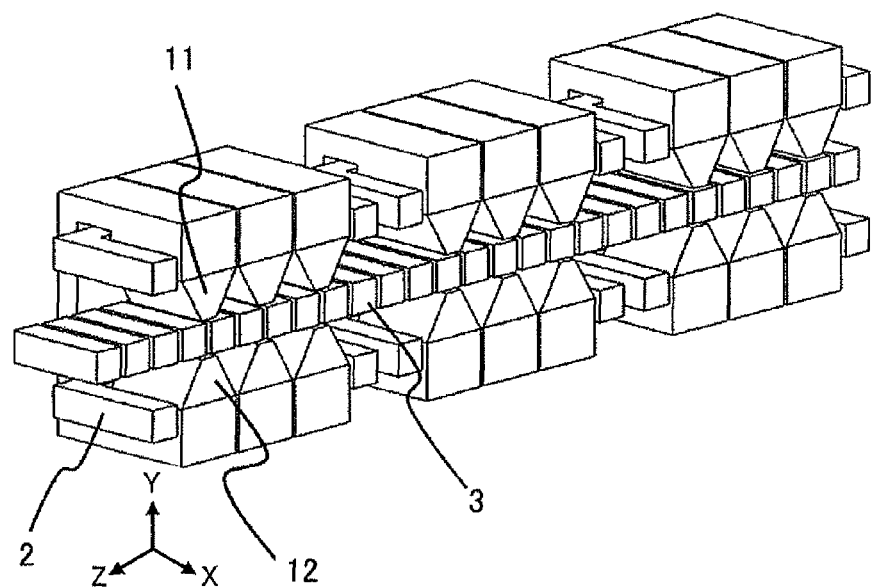
FIG. 16 shows the other embodiment of the present invention.

FIG. 16 shows an embodiment of the present invention.

FIG. 16 shows an example in which an armature unit is configured by three armature core units, and three armature units configure a three-phase linear motor. Also, FIG. 16 is a diagram cutting out a side of the coil in a vertical cross section relative to the travel direction so that the structure of a magnet portion can be seen. As an embodiment of the present invention, a structure can be employed in which a magnetic sequence that is originally a mover is fixed and the armature unit is moved.

Figure 17A:
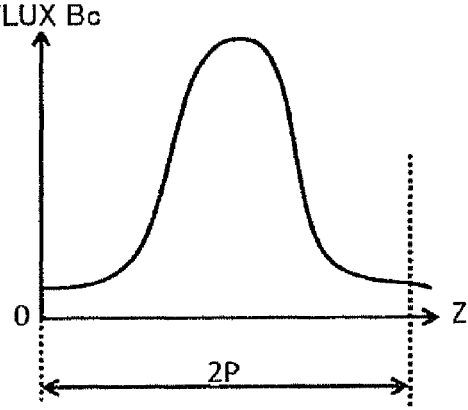
FIG. 17A shows a distribution of armature magnetic fluxes.
Figure 17B:
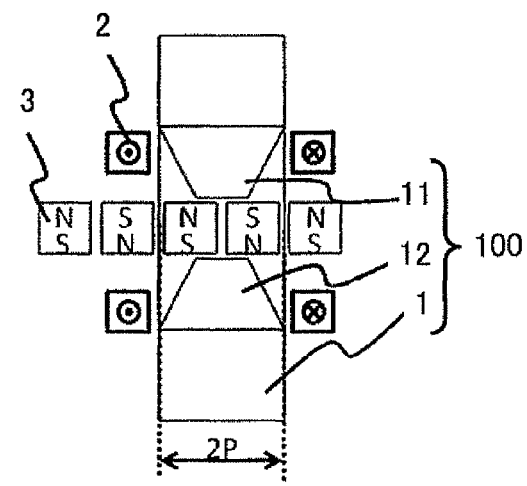
FIG. 17B is a cross-sectional view of a solo armature unit.

When a current is allowed to flow through a winding wound around the armature core of the present invention, an armature magnetic flux generated by the armature at the gap changes together with a change in a current value. When a constant DC current is supplied to the armature, armature magnetic fluxes generated at the gap of a region of 2P have a single polarity. FIG. 17A shows a distribution of armature magnetic fluxes Bc at a certain moment when a current with a constant value is supplied to the winding of the armature unit shown by the cross-sectional view of FIG. 17B. Depending on the structure of the armature, armature magnetic fluxes at an end of the 2P region become small or in a reverse direction, but have a substantially single polarity.

Next, FIGS. 18A and 18B show a distribution of magnetic fluxes generated by a magnet and a distribution of magnetic fluxes generated by an armature when a current is allowed to flow through a winding wound around the armature core. As is apparent from FIG. 18B, in a gap region of an armature core 1 with a length of 2P, there are two magnets. As shown in the upper part of FIG. 18A, armature magnetic fluxes Bc generated at the gap and at a certain current value when a current is supplied to the winding of the armature have a single polarity. On the other hand, as shown in the lower part of FIG. 18A, magnetic fluxes Bm generated by the magnets at the gap have two polarities.

Also, when a plurality of armatures are arranged and when a DC current is supplied to the winding of the armature, armature magnetic fluxes Bc have a distribution shown in FIG. 19. Magnetic fluxes generated by the plurality of armatures at the gap have a substantially single polarity.

According to the structures shown in FIGS. 17A to 19, a force is generated by a mutual action of the magnets having the two polarities. In any case, the armature has a single polarity, so that the interference of respective armatures in a magnetic flux can be reduced. When the positive/negative of a current is reversed, the direction of the armature magnetic flux is also reversed and has the opposite polarity, but in this case, also, the armature magnetic fluxes have a single polarity.

Seventh Embodiment

According to the present invention, the arrangement of the armature unit can be changed relative to a magnet array. In order to arrange a winding with an effective occupancy range, as shown in FIGS. 20A and 20B, respective units are alternately arranged relative to the magnet array, so that a space between the armature units can be utilized efficiently. FIG. 20A is a perspective view of an illustrative arrangement of the units and FIG. 20B is a top view thereof.

Eighth Embodiment

As shown in FIGS. 21A and 21B, when the armature unit has a triangular armature core unit 100 along the surface of the magnet, the occupancy space between respective units can be reduced. FIG. 21A is a perspective view showing an armature core in a triangular shape as viewed from the above, and FIG. 21B is a top view thereof.

Ninth Embodiment

Figure 22A:
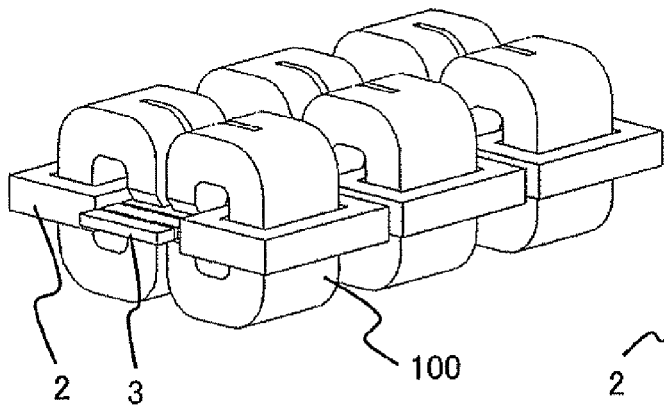
FIG. 22A is a perspective view showing an embodiment in which a magnet array is held between armature cores from both sides.
Figure 22B:
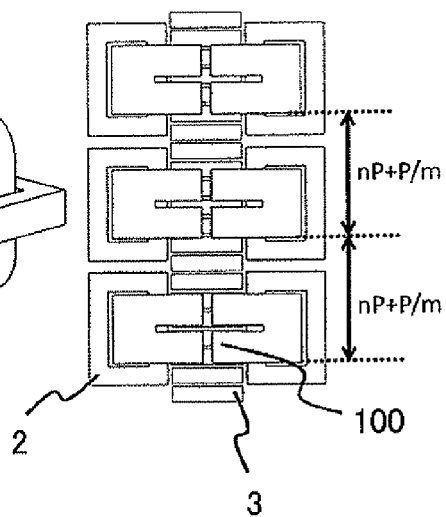
FIG. 22B is a top view showing the embodiment in which the magnet array is held between the armature cores from both sides.
Figure 23:
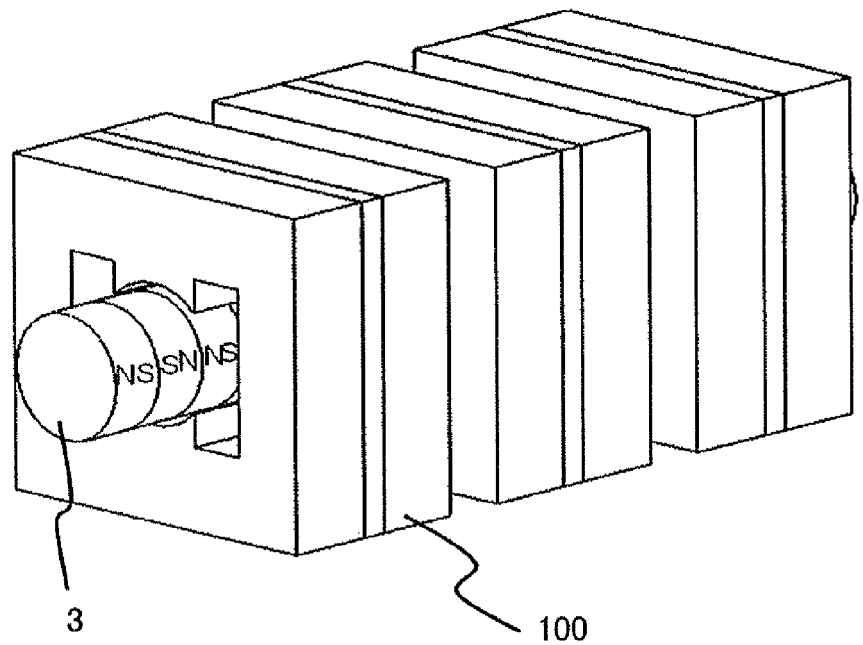
FIG. 23 shows an embodiment in which a magnet array is in a cylindrical shape.
Figure 24A:
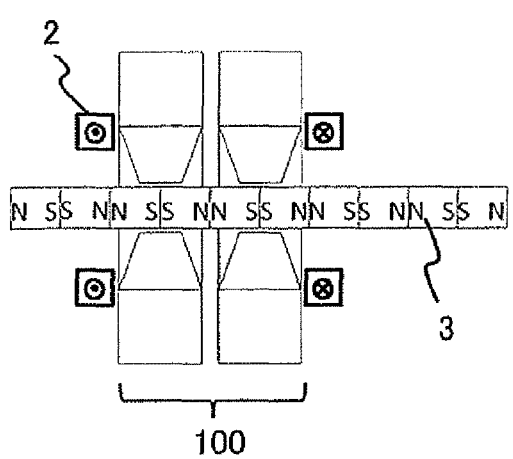
FIG. 24A shows an embodiment in which the arrangement of magnet is changed.
Figure 24B:
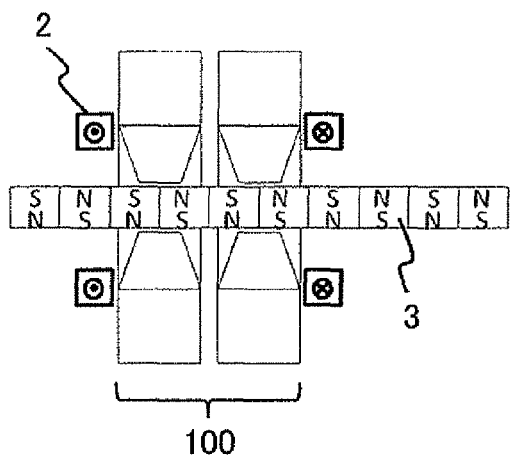
FIG. 24B shows an embodiment in which the arrangement of magnet is changed.

As shown in FIGS. 22A and 22B, a structure can be employed in which the magnet array is held from both sides thereof FIG. 22A is a perspective view showing an example in which the magnet array is held from both sides thereof and FIG. 22B is a top view thereof Tenth Embodiment As shown in FIG. 23, a magnet 3 can be in a round shape and the mover can be in a cylindrical shape. Regarding the arrangement of the magnet, as shown in FIGS. 24A and 24B, the magnets may be arranged so that their poles face each other and the pitch between the magnets is reduced.

Also, a linear motor was explained as an embodiment of the thrust generation mechanism of the present invention, but by supplying an AC current to the winding of an armature unit, a vibration type linear actuator becomes available which has a mover relatively reciprocating.

In the embodiments of the present invention, a linear motor was explained which has the magnets arranged linearly, but when the magnets are circularly arranged, it can be driven as a rotating electrical machine. Regarding the arrangement of the magnet array in this case, the magnet array can be arranged like a discoid or like a circular cylinder.

Although the armature cores in the same shape are combined in the above-explained embodiments, armature cores in different shapes may be used as long as the same function can be accomplished.

In the above-explained embodiments, a plurality of armatures are individually explained but the same effect can be obtained when the plurality of armatures are used integrally.

Next, other embodiments of the present invention will be explained below with reference to the accompanying drawings.

Eleventh Embodiment

Figure 25:
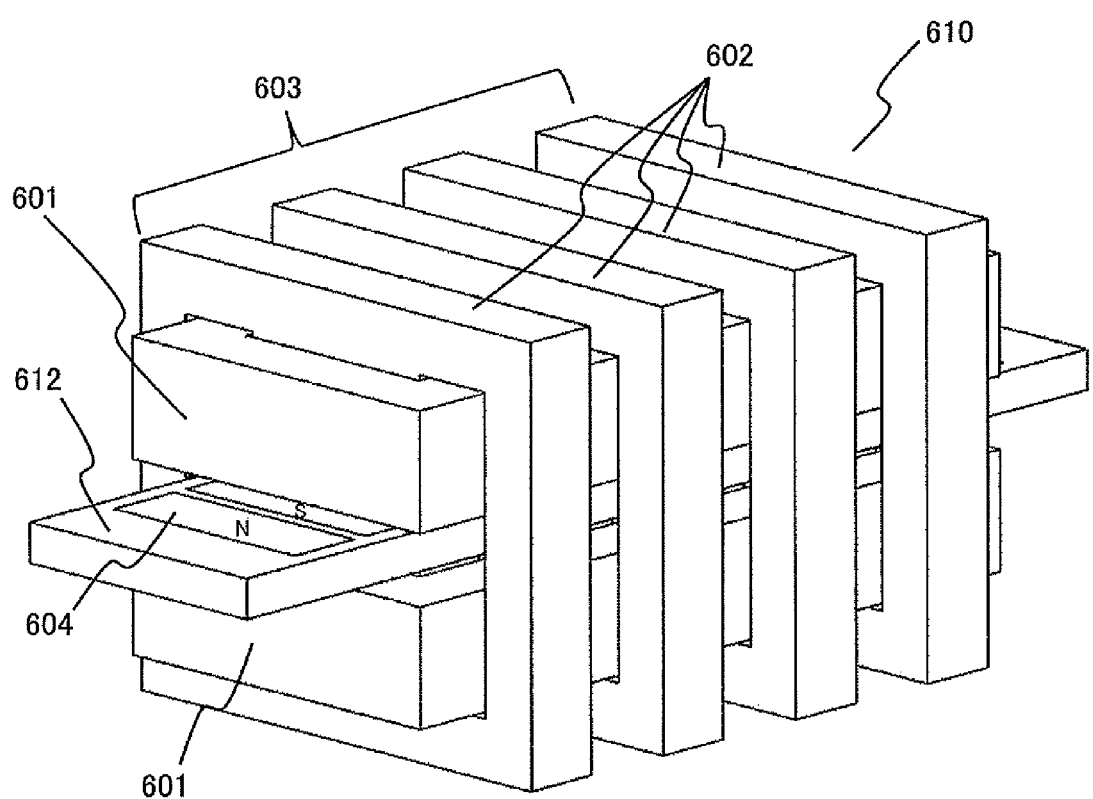
FIG. 25 is a perspective view showing an armature unit configuring a drive device according to an eleventh embodiment of the present invention.
Figure 26:
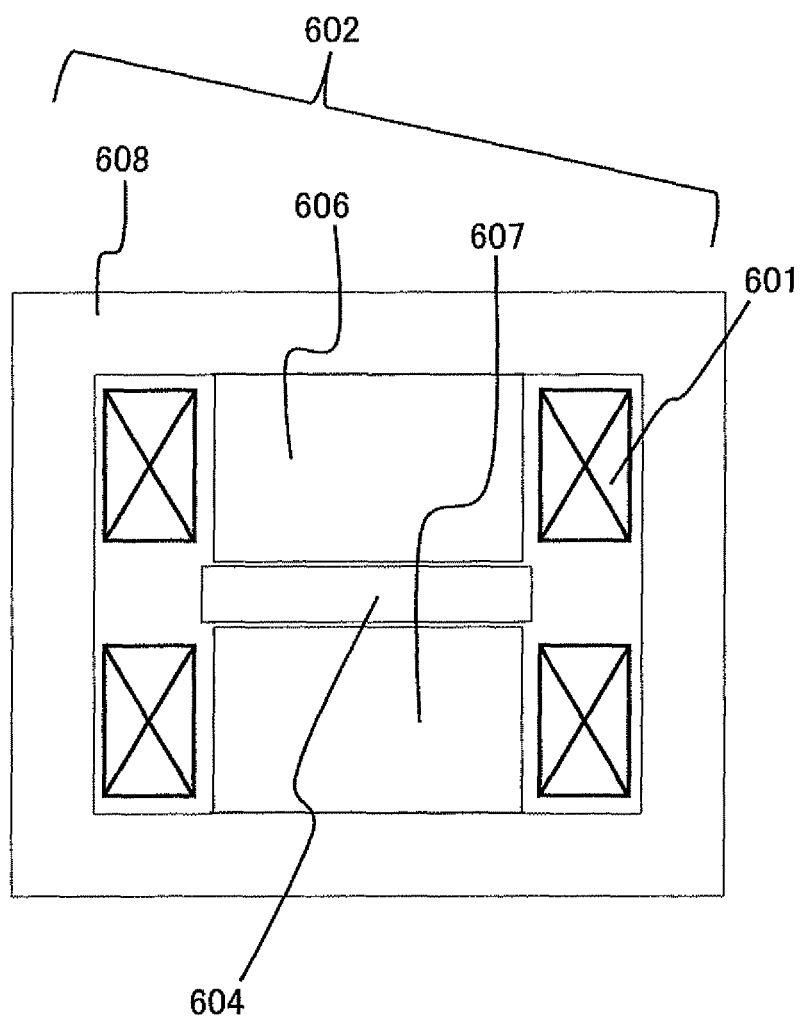
FIG. 26 is a cross-sectional view showing the armature unit of FIG. 25.

FIG. 25 is a perspective view of an armature unit configuring a drive device according to an eleventh embodiment of the present invention. An armature unit 610 includes windings 601 by what corresponds to one phase, a stator 3 having a plurality of magnetic poles 602, and a magnet array 612 having a sequence of permanent magnets 604. FIG. 26 is a cross-sectional view showing the armature unit 610 of the drive device according to the eleventh embodiment cut along a surface orthogonal to the travel direction of the magnet array 612. As shown in FIG. 26, the magnetic pole 602 includes an upper polar tooth 606 and a lower polar tooth 607 both arranged so as to face the magnet 604, and a core 608 that connects those teeth. Windings 601 are commonly wound around respective upper and lower polar teeth 606 and 607 of the plurality of magnetic poles 602. The winding 601 may be wound around the other portion of the magnetic pole 602, and the upper and lower polar teeth 606 and 607 and the core 608 may be integrally formed.

The magnet array 612 shown in FIG. 25 includes the magnets 604 that are arranged so that adjacent magnets have opposite polarities. The stator 603 is fixed to a structural object in general, and the magnet array 612 including the magnets 604 is moved relative to the stator 603. A structure in which the magnet array 612 is fixed and the magnetic pole 602 is moved may be employed.

Figure 27:
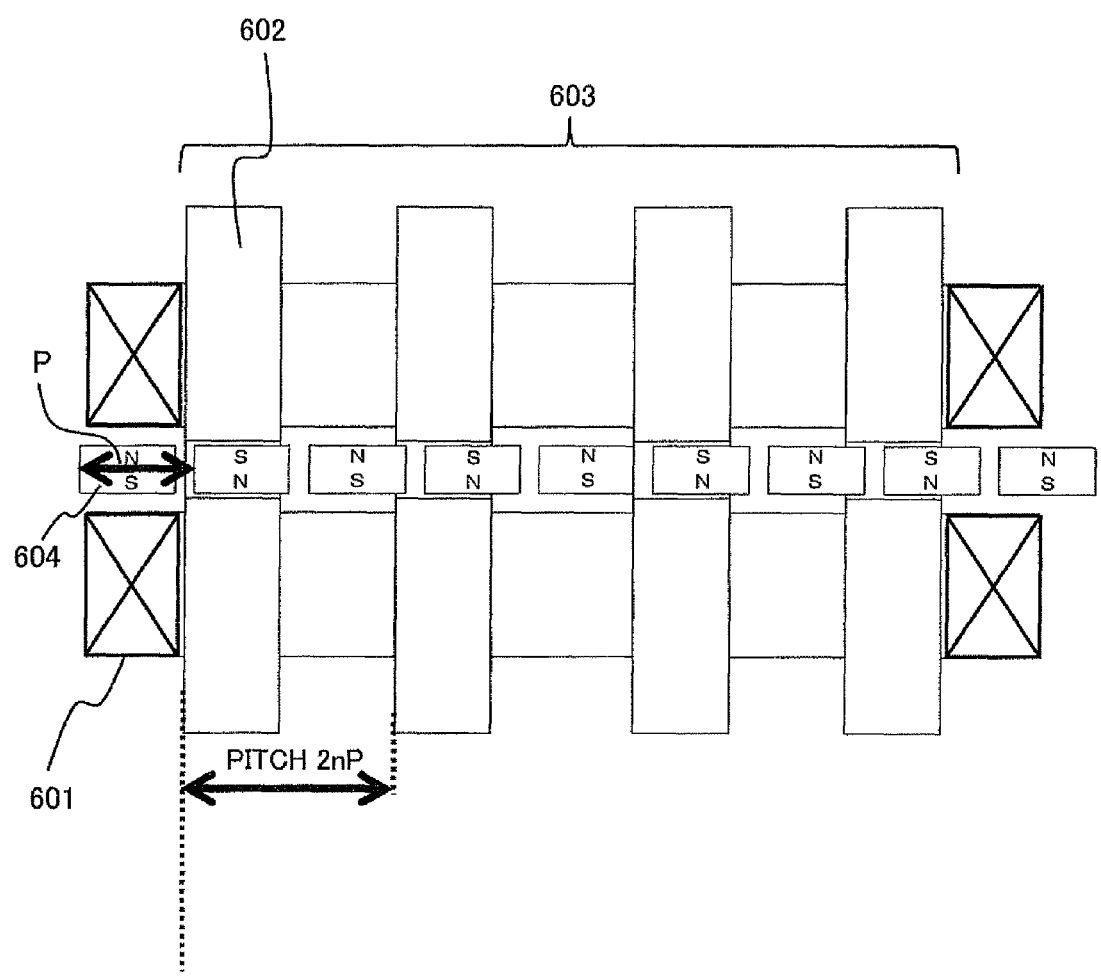
FIG. 27 is a cross-sectional view showing the armature unit of FIG. 25.

FIG. 27 is a cross-sectional view showing the armature unit 610 configuring the drive device according to the eleventh embodiment of the present invention cut along a surface parallel to the travel direction of the magnet array 612. The magnetic poles 602 are arranged at, when the pitch of the magnet is P, a clearance which is substantially 2nP in the travel direction of the magnet array 612 where n is 1, 2, 3, ..

. . The pitch of the magnetic pole 602 configuring the armature unit is substantially 2nP, but the ripple of a thrust can be reduced by adjusting such a pitch.

Figure 28:
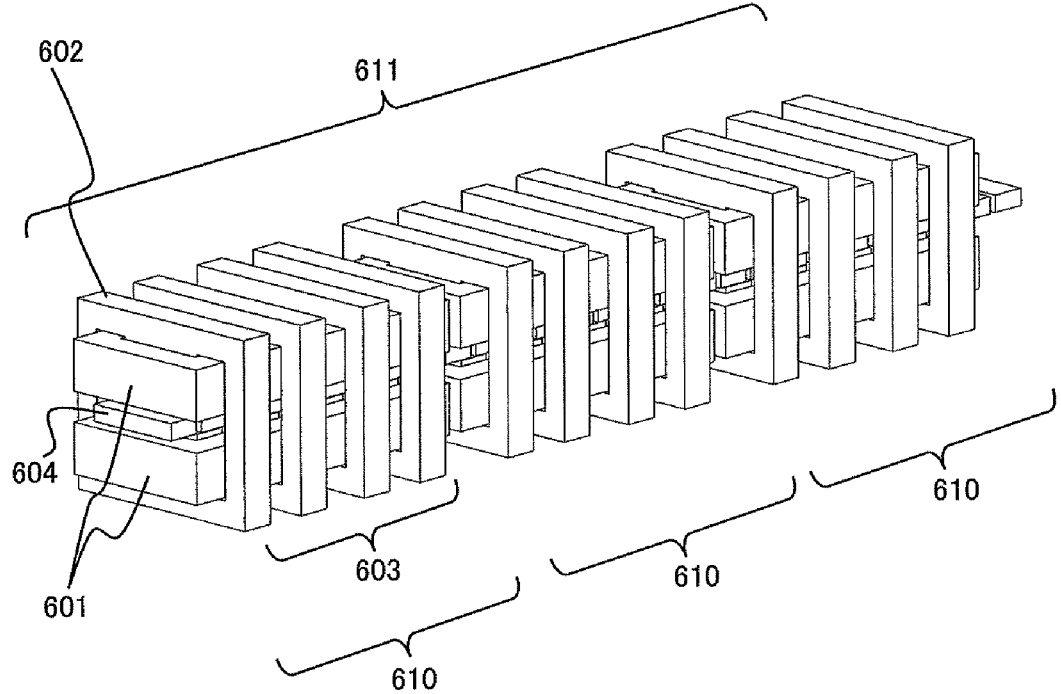
FIG. 28 shows a drive device according to an embodiment of the present invention.

FIG. 28 shows an illustrative drive device driven at three phases and using three armature units 610 each having four magnetic poles 602 and shown in FIG. 27. When the pitch of the magnets 604 in the travel direction of the magnet array 612 is P, by arranging the armature units 610 at a phase difference of 2P/m (where m is the number of phases of the drive device), the drive device can be configured. The drive device can be driven by an m-phase AC by setting the pitch of the armature unit 610 to be nP+(2P/m) or nP+(P/m) (where n=1, 2, 3, . . . ). That is, m number of armature units 610 configure an m-phase drive device. In FIG. 28, the number of magnetic poles 602 of the armature unit 610 is four, but the present invention is not limited to this number.

Figure 29:
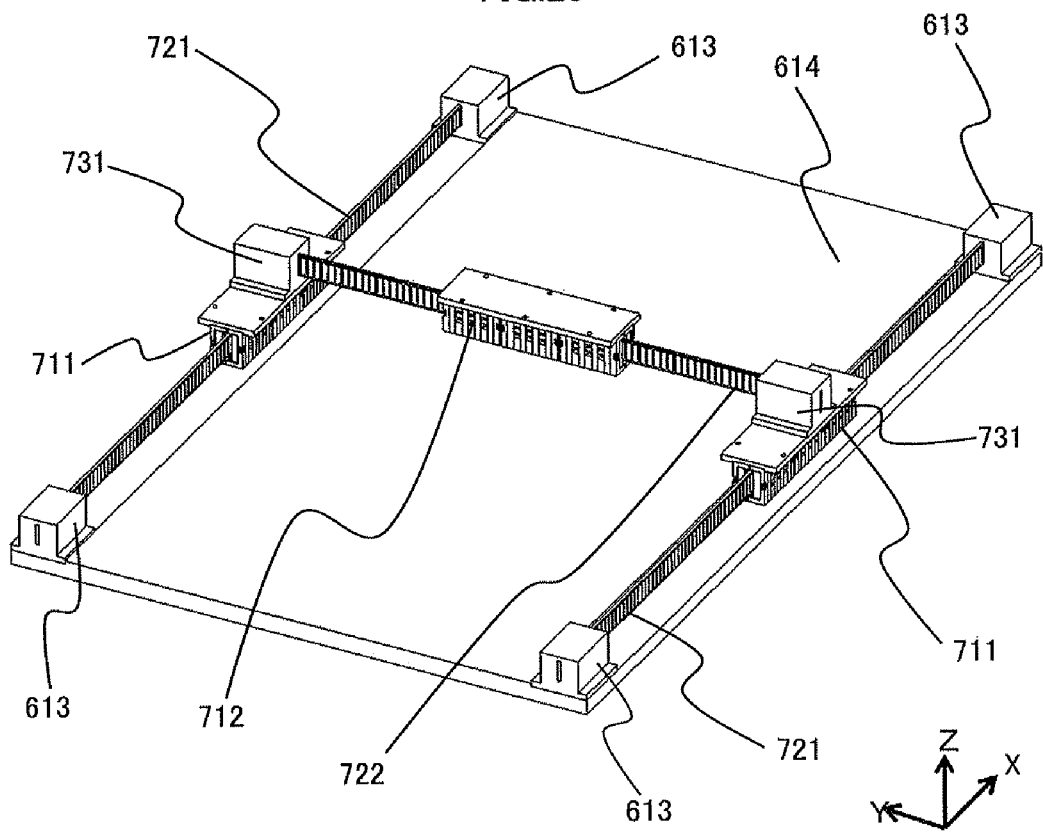
FIG. 29 shows an illustrative configuration of an XY stage of the present invention.

FIG. 29 shows an example in which an XY stage is configured by the drive device 611 shown in FIG. 28. Magnet-sequence fixing stages 613 are fixed to a base 614. X-axis magnet arrays 721 are respectively held by the magnet-sequence fixing stages 613, and X-axis drive devices 711 are arranged so as to maintain a constant clearance relative to respective X-axis magnet arrays 721. Driving in the X axis direction is realized by the two X axis drive devices 711 arranged parallel to the X axis. Magnet-sequence fixing stages 131 installed on respective X-axis drive devices 711 fix a Y-axis magnet array 722. A Y-axis drive device 712 that moves relative to the magnet array realizes a stage that can operate on the X and Y axes. By configuring the X axis and Y axis drive devices using the drive device of the present invention, the magnet arrays 721 and 722 on the X axis and on the Y axis can be light-weighted, so that the whole device can be light-weighted. Also, the light-weighted drive devices on the X axis and on the Y axis improve the responsiveness of the system and reduce the load thereto.

Twelfth Embodiment

Figure 30:
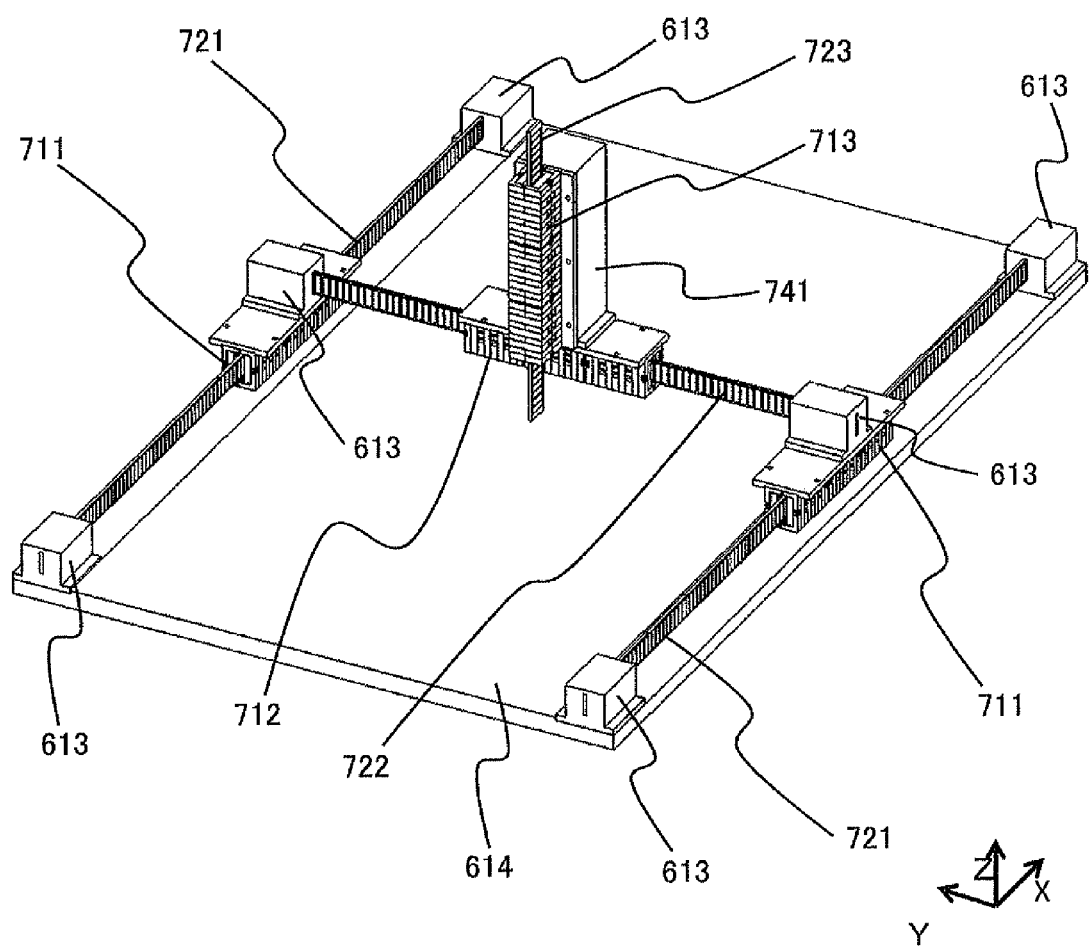
FIG. 30 shows an illustrative configuration of an XYZ stage of the present invention.

FIG. 30 shows a configuration according to a twelfth embodiment of the present invention. A Z-axis base 741 is mounted on the XY stage having the X and Y axes configured by the drive devices shown in FIG. 28, and the XY stage also has a Z-axis drive device 713 and a Z-axis magnet array 723. It is possible that the Z-axis drive device 713 is directly fixed to the Y-axis drive device 712, etc., without the Z-axis base 741 being installed. In this embodiment, a light-weighted drive device in the Z axis can be configured. According to the related art, relative positions among respective axes are changed due to a deformation that is produced when the X and Y axes are driven by the weight, etc., on the Z axis. However, the weight reduction of the drive unit makes the relative positions among respective axes stable, and improves the positional precision. Also, the weight of the whole stage can be reduced, so that the load thereto is reduced and thus the responsiveness of the stage improves.

Thirteenth Embodiment

Figure 31:
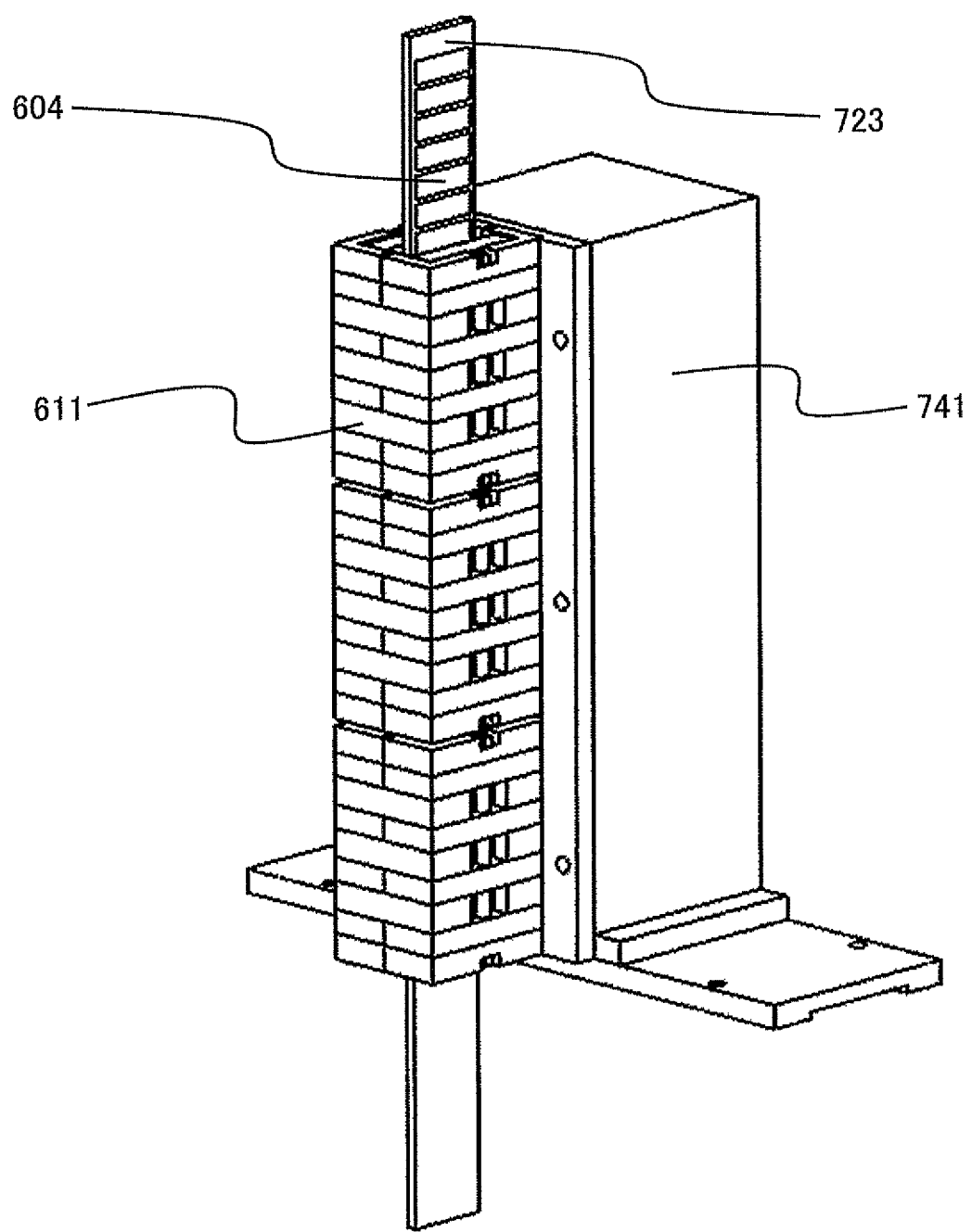
FIG. 31 is a diagram showing a configuration of a Z axis drive system according to the present invention.

FIG. 31 shows a thirteenth embodiment of the present invention. FIG. 31 is a configuration diagram of a Z axis drive system according to the present invention. A drive device 611 is attached to a Z-axis base 741. According to the configuration of this embodiment, since leakage flux is reduced, a Z-axis magnet array 723 can be light-weighted. The Z axis direction is a direction in which gravity acts, and the weight of the Z-axis magnet array 723 always acts as a load. Hence, it is necessary to provide power to the drive device 611 in order to support the weight of the Z-axis magnet array. According to the present invention, since a light-weighted Z-axis magnet array 723 can be configured, power necessary for supporting the weight can be little. Also, when the magnet array is about to fall down because of the weight of the Z-axis magnet array 723, a force is generated by the attraction force of magnets 604 in a direction that suppresses the falling, and thus the falling of the magnet array can be suppressed. Also, since the Z-axis magnet array 723 is light-weighted, the responsiveness and the positional precision when the magnet array 723 is positioned can be improved. At the same time, the whole Z-axis drive system can be configured as being light-weighted and compact, so that restriction of the installation space is little and the installation workability is improved.

Fourteenth Embodiment

Figure 32:
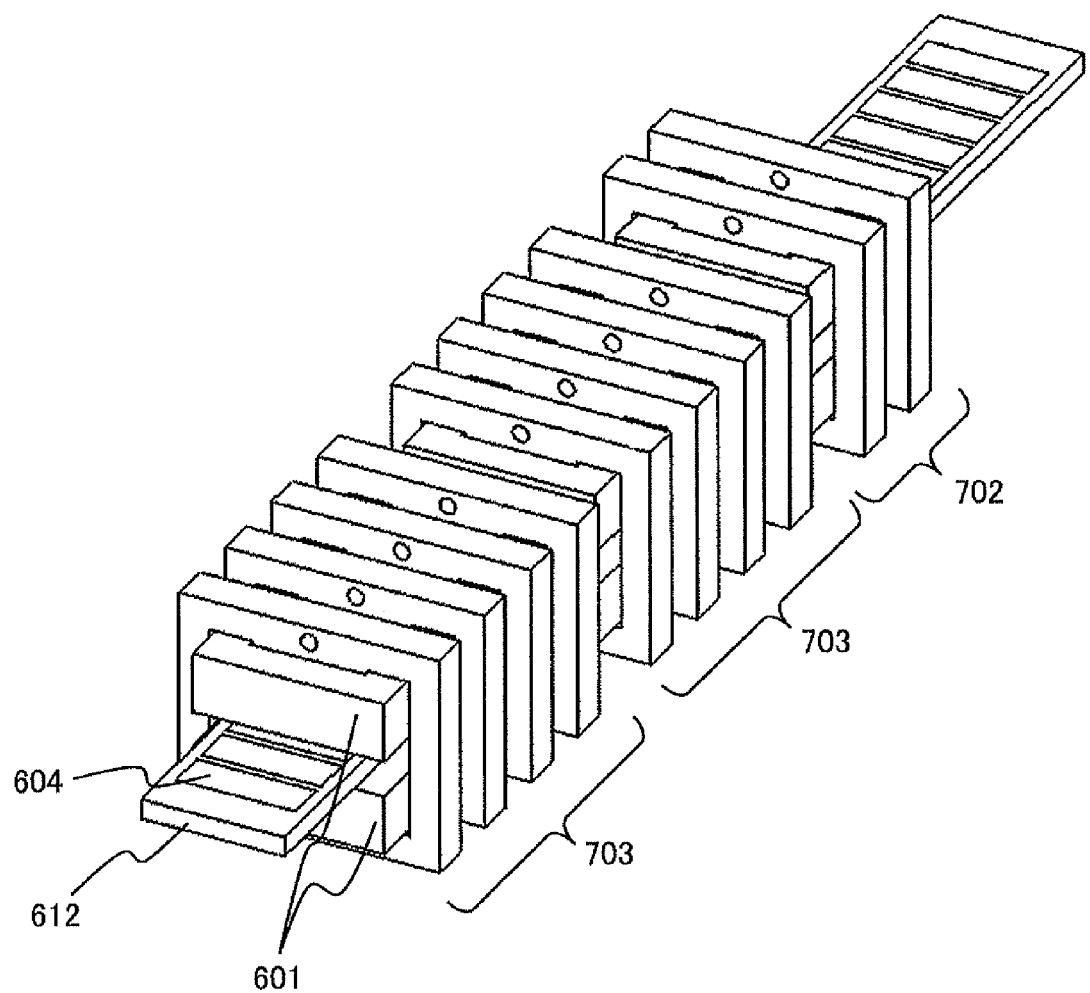
FIG. 32 shows a drive device according to an embodiment of the present invention.

FIG. 32 shows a fourteenth embodiment of the present invention. FIG. 32 is an example in which a drive device is configured by three armature units. The present invention indicates that by changing the number of magnetic poles of the armature units in accordance with a necessary thrust pattern, a compact and light-weighted drive device can be configured. FIG. 32 shows an example in which two armature units 703 each having four magnetic poles and an armature unit 702 having two magnetic poles configure a drive device. When, for example, a necessary thrust differs depending on the position of a magnet array 612, a compact and light-weighted drive device can be configured by changing the number of magnetic poles of the armature unit.

Figure 33:
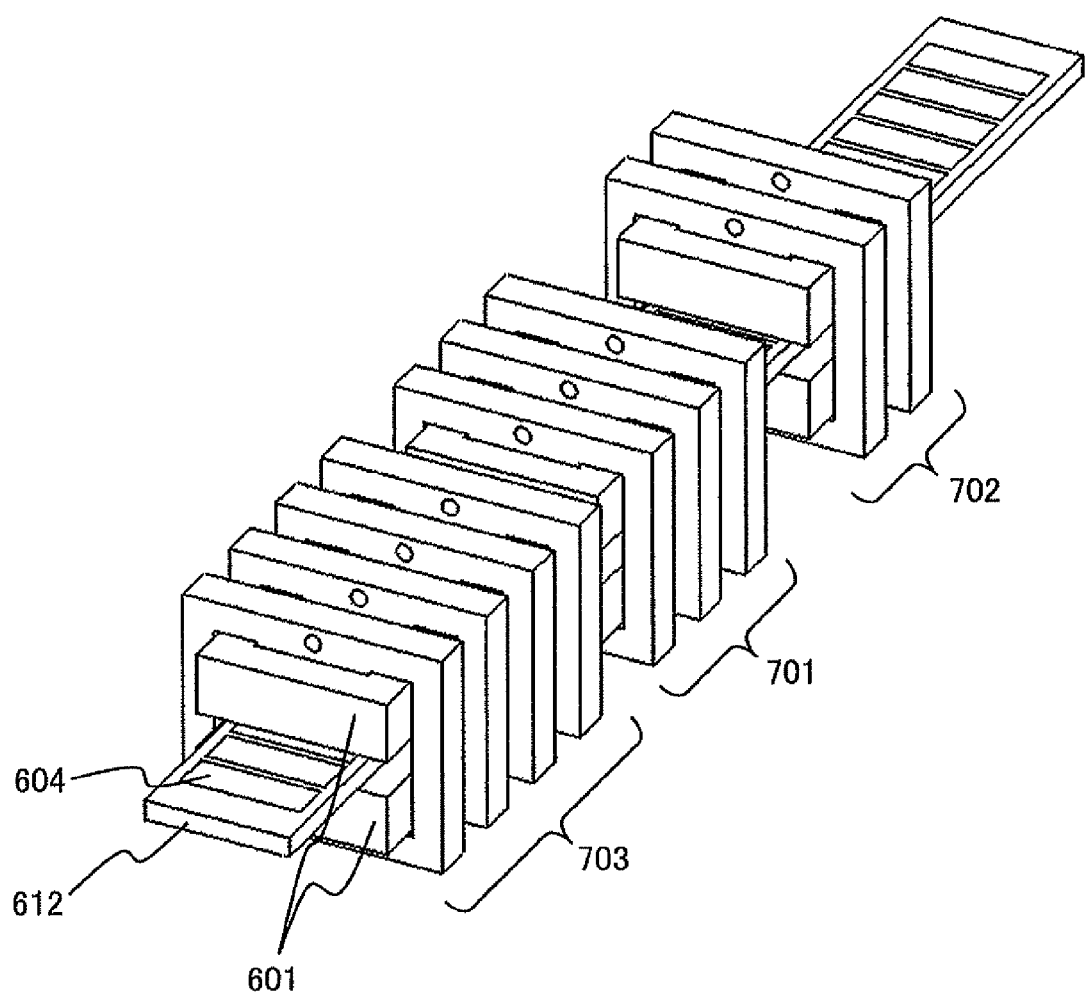
FIG. 33 shows a drive device according to an embodiment of the present invention.
Figure 34:
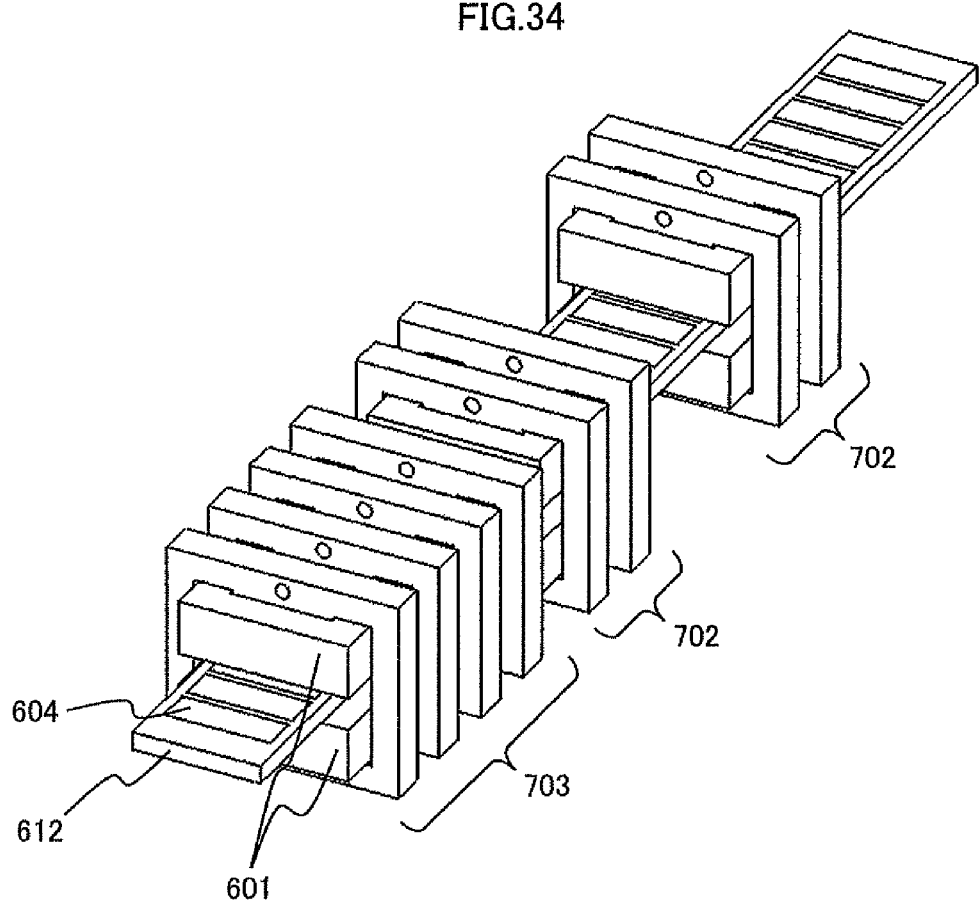
FIG. 34 shows a drive device according to an embodiment of the present invention.

FIG. 33 shows an example in which a drive device is configured by an armature unit 703 having four magnetic poles, an armature unit 701 having three magnetic poles, and an armature unit 702 having two magnetic poles. FIG. 34 shows an example in which a drive device is configured by an armature unit 703 having four magnetic poles, and two armature units 702 each having two magnetic poles. The clearance between respective armature units can be changed depending on the pattern of a necessary thrust. For example, when m number of armature units are driven by an AC current at an m phase, the pitch between the armature units can be set to be nP+(2P/m) or nP+(P/M) (where n=1, 2, 3, . . . ). The arrangement clearance of the armature unit can be adjusted in accordance with the necessary thrust pattern.

Fifteenth Embodiment

Figure 35:
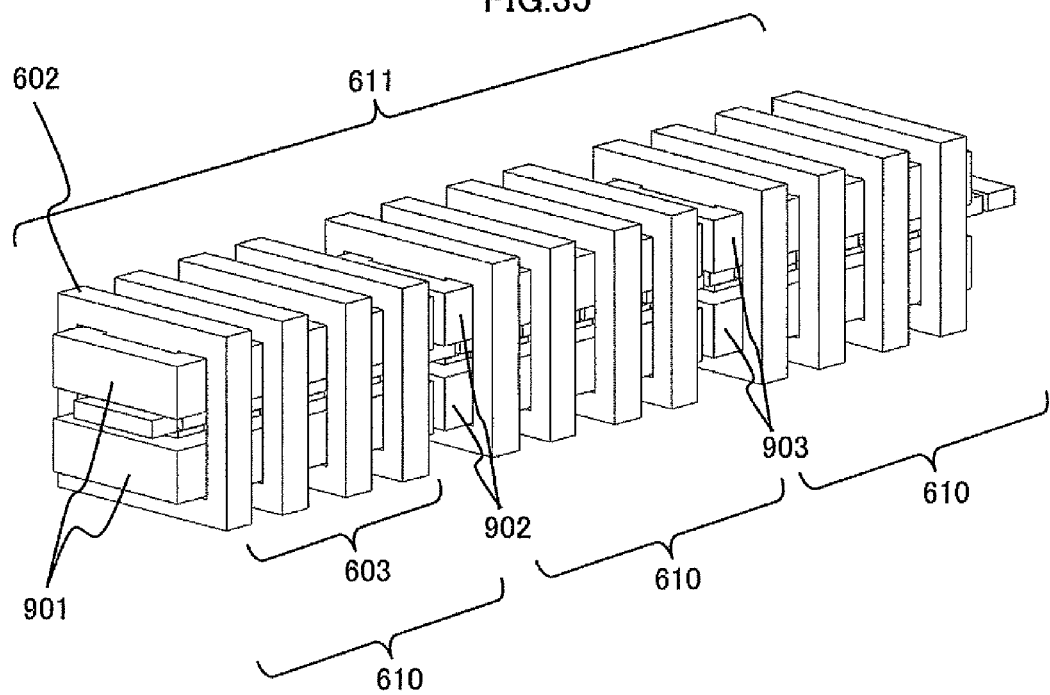
FIG. 35 shows a drive device according to an embodiment of the present invention.

FIG. 35 shows a fifteenth embodiment of the present invention. FIG. 35 shows an embodiment in which the number of turns of the winding arranged in the armature unit 610 of the drive device shown in FIG. 28 or the cross-sectional area of a wire is changed for each armature unit.

FIG. 35 is an example in which a drive device 611 is configured by three armature units 610. Each armature unit includes four magnetic poles, but the number of magnetic poles is not limited to this example, and the number of magnetic poles may differ armature unit by armature unit. Also, by changing respective numbers of turns of a winding 901, a winding 902, and a winding 903 arranged in respective armature units, a thrust in accordance with a necessary thrust pattern can be generated.

For example, an armature unit that needs a large thrust can be realized by increasing the number of turns. Also, an armature unit that is desirable to decrease heat generation can be realized by increasing the cross-sectional area of the winding of that armature unit. Also, when it is desirable to decrease heat generation only at the center of the drive device shown in FIG. 35, the cross-sectional area of the winding of the armature unit at the center is increased and the windings of the armature units at both ends are reduced relative to the cross-sectional area of the winding of the center, so that a heat generation portion can be controlled. A compact and light-weighted drive device can be configured by changing the number of turns of the winding of the armature unit and the cross-sectional area thereof in consideration of a thrust pattern and a heat generation. Also, by changing the number of turns of the winding and the cross-sectional area thereof, the inductance and the resistance for each armature unit also change, so that the responsiveness for each armature unit can be controlled.

Sixteenth Embodiment

Figure 36:
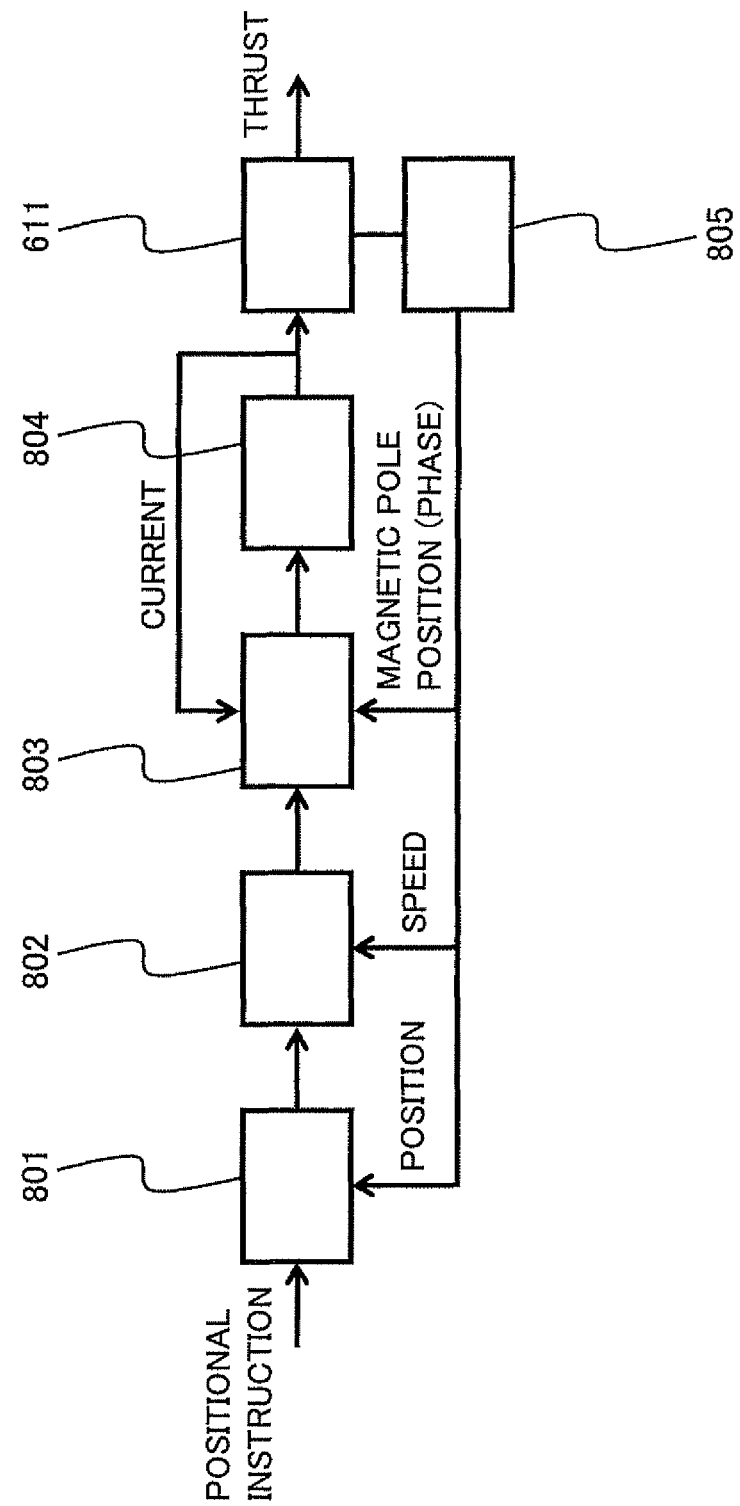
FIG. 36 shows a drive device according to an embodiment of the present invention.

FIG. 36 shows a sixteenth embodiment of the present invention. A drive device 611 shown in FIG. 36 is the drive device shown in FIG. 28, and discloses a control system thereof. This drive device has a linear scale 805 that detects relative positions of the stator and the magnet array. The installation position of the linear scale 805 is not limited to any particular one as long as it can detect relative positions of the stator and the magnet array. Positional information obtained by the linear scale is supplied to a current controller 803 as a magnetic pole position (phase) information in a feedback manner, and the magnetic flux by the magnet array and the magnetic flux by the stator are controlled so as to maintain a predetermined phase difference. Information on the linear scale 805 is supplied to a position controller 801 and a speed controller 802 as positional information and speed information, respectively, in a feedback manner, and the current controller calculates and obtains a current allowed to flow through the winding of the armature unit of the drive device based on respective values of the above-explained information. An output by a power amplifier 804 is adjusted to be the obtained current value. Information on the current value of the power amplifier 804 is supplied to the current controller in a feedback manner, and a thrust by the drive device is controlled to be a predetermined value.

By configuring the control system and the control loop shown in FIG. 36 in the drive device of the present invention, a drive system that is highly responsive and precise can be built by the light-weighted magnet array and the drive device which generates a large thrust.

Seventeenth Embodiment

Figure 37:
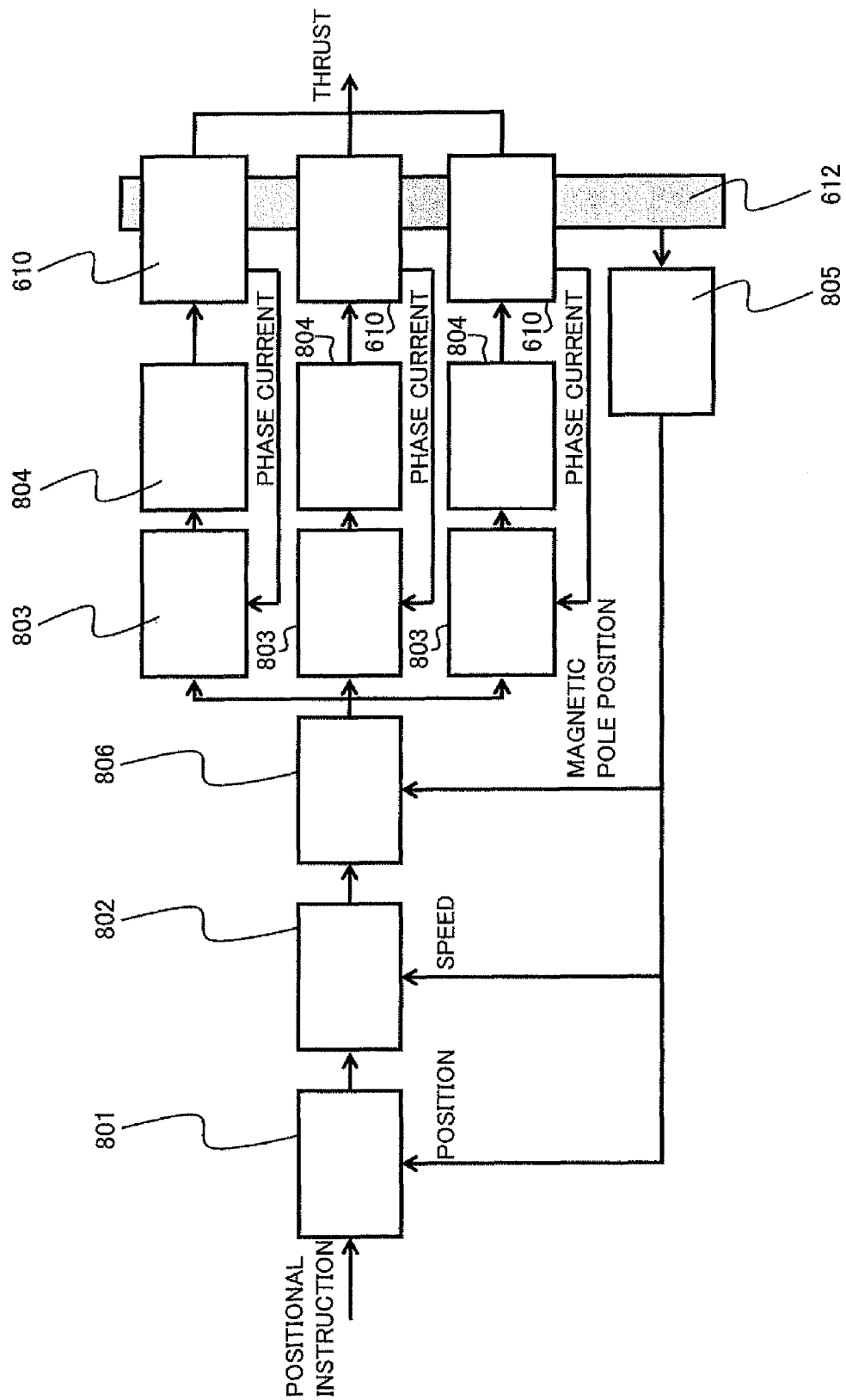
FIG. 37 is a block diagram showing a control system of a drive device of the present invention.
Figure 38:
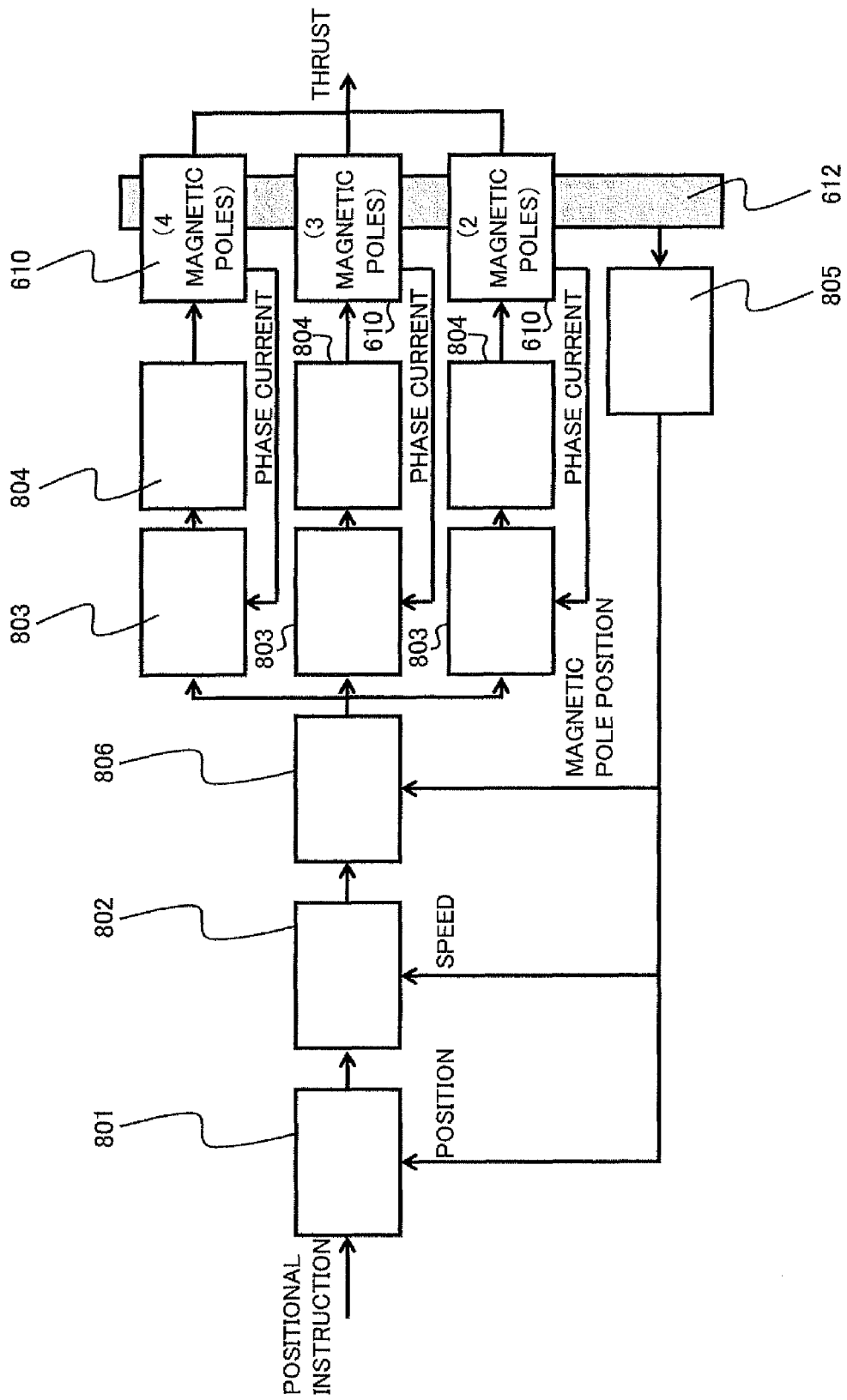
FIG. 38 is a block diagram showing another control system of a drive device of the present invention.

FIG. 37 shows a seventeenth embodiment of the present invention. FIG. 37 is a block diagram of a control system when a drive device is configured by three armature units. Three armature units 610 have the same number of magnetic poles. A magnet array 612 commonly arranged to the three armature units is provided with a linear scale 805. Based on the signal from that linear scale, pieces of information on a magnetic pole position between the magnet array and the armature unit, a speed, and a position are supplied to a phase current referring unit 806, a speed controller 802 and a position controller 801, respectively, in a feedback manner. The phase current referring unit 806 calculates a current value allowed to flow through each armature unit 610. In accordance with a reference therefrom, the current controller 803 adjusts the current, and a power amplifier 804 supplies power. According to the configuration of the present invention, respective armature units 610 have current control systems independent from one another. Such a configuration makes unbalancing among the armature units in production thereof controllable by a current value. Also, other effects like disturbance can be reduced. FIG. 38 is a block diagram when respective numbers of magnetic poles of armature units configuring the drive device differ from one another. Unbalancing among the armature units arranged in accordance with a necessary thrust pattern and having different numbers of magnetic poles can be individually controlled, so that the controllability improves. Also, by individually controlling current values, the ripple of detent and a thrust can be controlled for each armature unit. As an example, FIG. 38 is a block diagram showing a case in which respective numbers of magnetic poles of the armature units 610 are four, three, and two.

Eighteenth Embodiment

Figure 39:
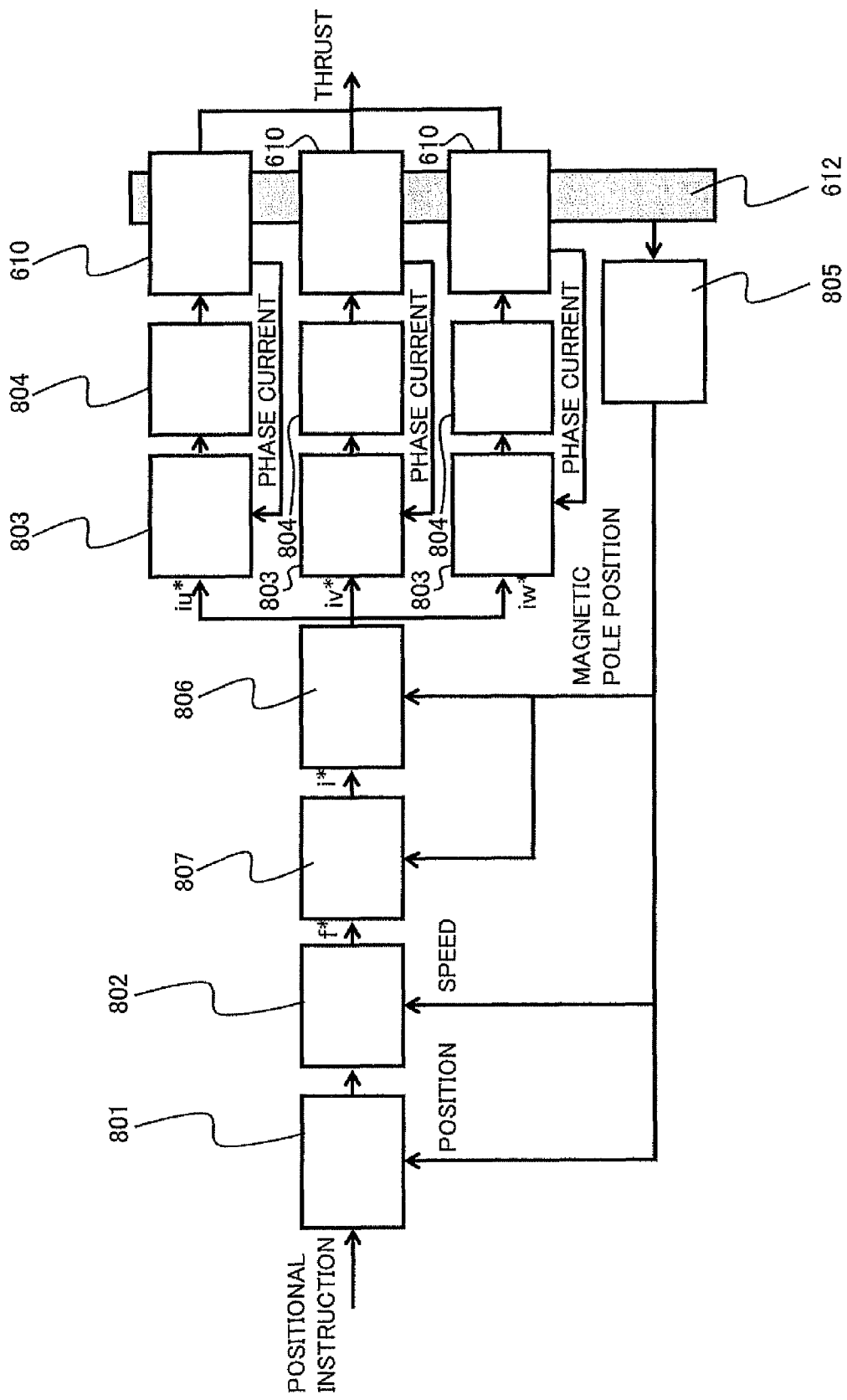
FIG. 39 is a block diagram showing the other control system of a drive device of the present invention.

FIG. 39 shows an eighteenth embodiment of the present invention. FIG. 39 shows a configuration of a feedback control system of a magnetic pole position, a speed, and a position based on a signal from a linear scale that detects a mutual positional relationship between a magnet array 612 commonly arranged to three armature units 610 and the armature unit 610. When three armature units 610 configured are in a U phase, a V phase, and a W phase, respectively, current reference values iu*, iv*, and iw* for respective phases are calculated by a current value calculator 807 and a phase current referring unit 806 based on the positional information from a linear scale 805. The current value calculator 807 obtains a current reference value i* based on a relationship between a current and a thrust at a position of each magnet array. The current is divided into respective phases based on the current reference value i*. Respective armature units are subjected to current control in accordance with respective phase current reference values iu*, iv*, and iw*. A control is enabled when, for example, a thrust relative to a unit current decreases due to a magnetic saturation of the magnetic pole, and a controllable range extends, thereby improving the controllability. Also, correction of disturbance generated at individual armature unit and precise control thereof are enabled.

When, for example, the winding of the armature unit 610 and the number of magnetic poles are changed for each armature unit, a thrust can be controlled by changing a current reference i* to a thrust reference f* based on the position of the magnet array 612. At the time of obtaining the current reference i* from the thrust reference f*, if calculation is carried out using the positional information of the magnet array, unbalancing among the armature units, disturbance, and the like can be suppressed.

Nineteenth Embodiment

Figure 40A:
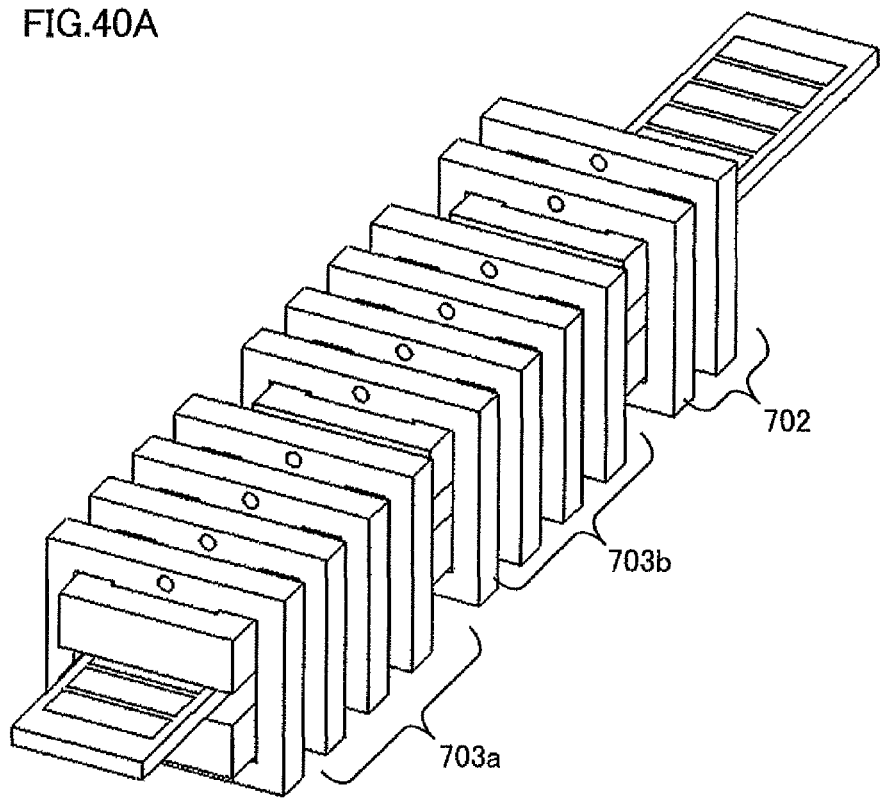
FIG. 40A is a perspective view showing an embodiment of a drive device of the present invention.
Figure 40B:
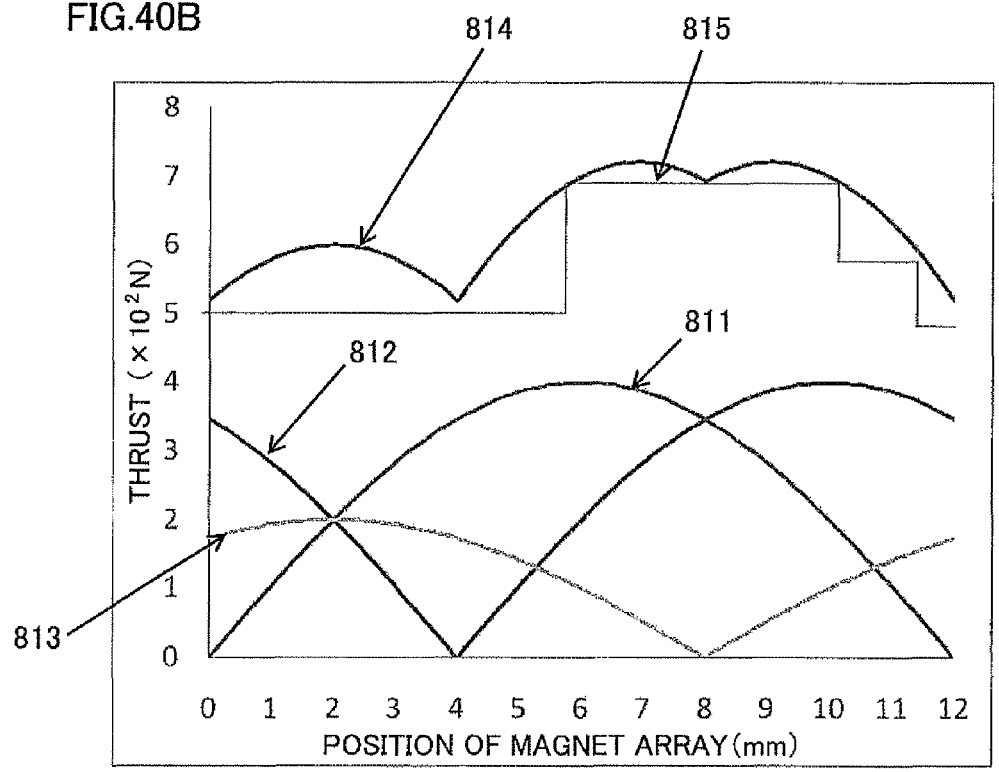
FIG. 40B is a graph showing the thrust characteristic of the drive device.

FIGS. 40A and 40B show a nineteenth embodiment of the present invention.

FIG. 40A Shows a drive device including armature units 703a and 703b each having four magnetic poles, and an armature unit 702 having two magnetic poles.

When the pitch of magnet is 180 degrees, respective armature units are arranged so as to have a phase difference of 120 degrees. Also, a magnet pitch P is set to be 12 mm in this embodiment.

FIG. 40B shows a thrust characteristic of the drive device.

The graph of FIG. 40B indicates that a thrust by the drive device changes depending on the position of a magnet array. A graph 815 indicates a necessary thrust required as a drive device, and graphs 811, 812, and 813 indicate thrusts of the armature units 703a, 703b, and 702 respectively. Also, a graph 814 indicates a total thrust of the armature units 703a, 703b, and 702.

As is indicated by the graphs, the maximum value of the thrust 811 by the armature unit 703a and the maximum thrust of the thrust 812 by the armature unit 703b are 400 N. In contrast, the maximum value of the thrust 813 by the armature unit 702 is 200 N. Within a range in which the position of the magnet array is, for example, from 0 to 6 mm, a necessary thrust is 500 N, and at magnet positions from 6 mm to 10 mm, a thrust of 650 N is necessary, and at magnet positions from 10 mm to 12 mm, when a thrust 815 needing a pattern of slightly changing a necessary thrust to be 550 N is applied, by reducing the number of magnetic poles of the armature unit 3 within the range where the thrust is small, the drive device can be compact and light-weighted.

Also, in FIG. 40B, when a reciprocal motion is carried out at magnet array positions from 7 mm to 9 mm, the thrust 811 by the armature unit 703a and the thrust 812 by the armature unit 703b are large but the thrust by the armature unit 702 is substantially zero. In this case, it is possible to further reduce the number of magnetic poles of the armature unit or to configure a drive device by the armature unit 703a and the armature unit 703b. By changing the number of magnetic poles, the winding, and the position of the armature unit in accordance with a necessary thrust pattern, a compact and light-weighted drive device can be provided.

Figure 41:
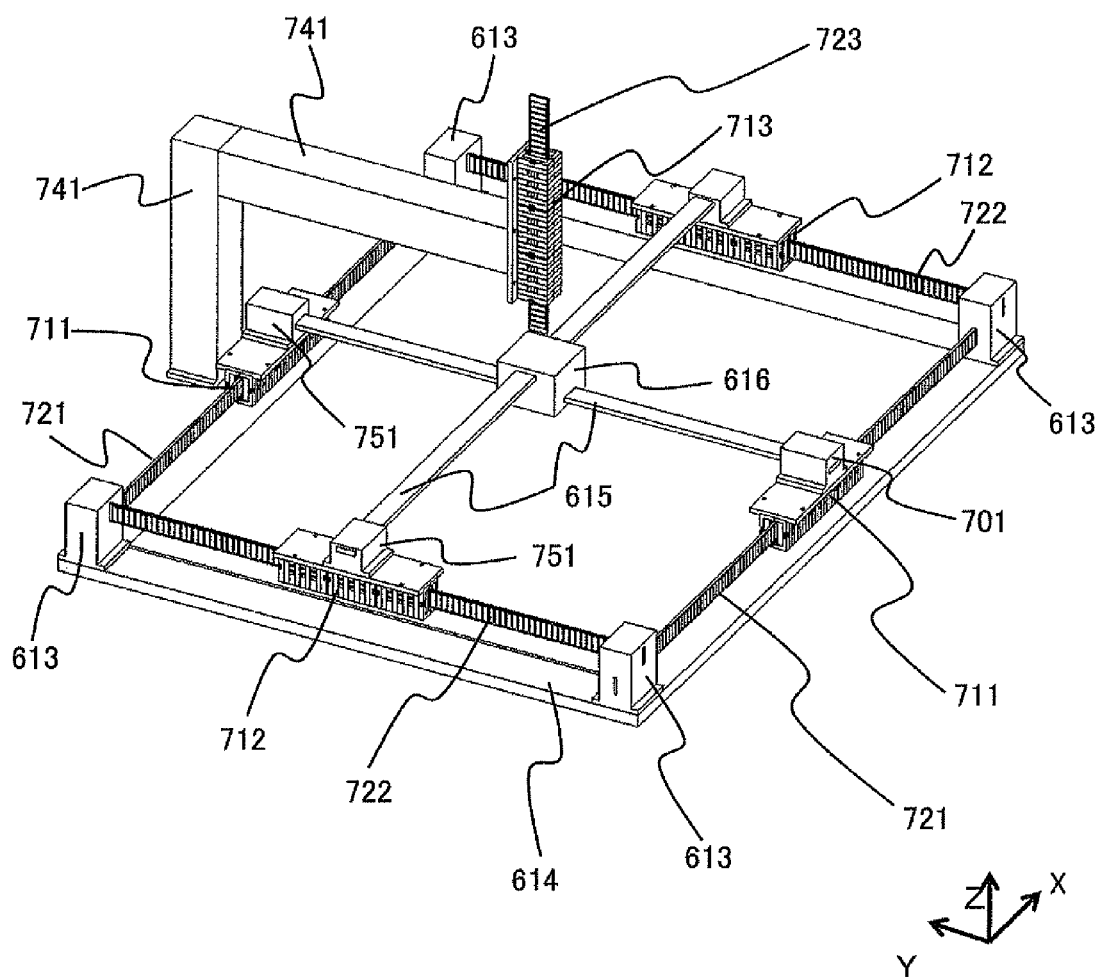
FIG. 41 shows an illustrative configuration of an XYZ stage of the present invention.

FIG. 41 shows an illustrative XYZ stage of the present invention. Two X-axis drive devices 711 and two Y-axis drive devices 712, a total of four drive devices configure an XY stage, a Z-axis base 741 is installed outside the stage, and a Z-axis drive device 713 is mounted on the Z axis base 741.

Figure 42:
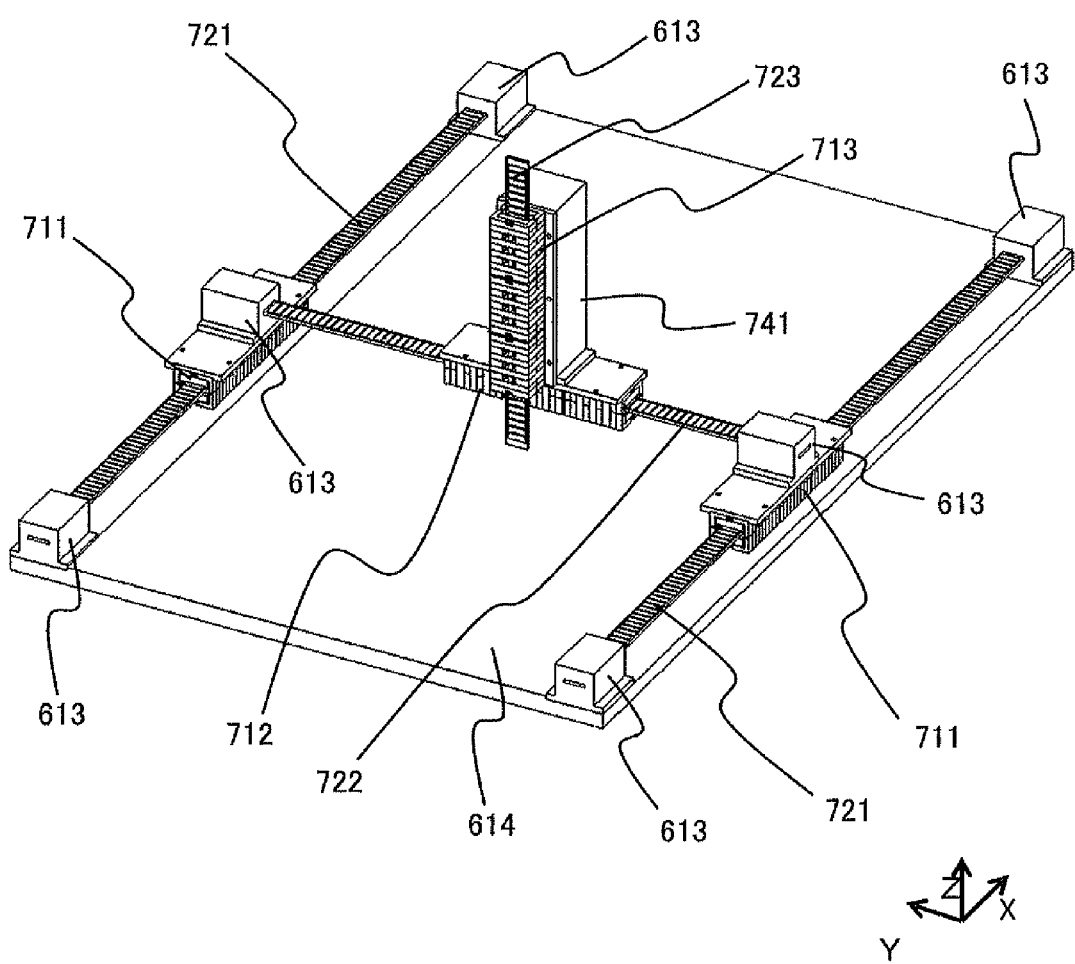
FIG. 42 shows another illustrative configuration of an XYZ stage of the present invention.

FIG. 42 shows another illustrative XYZ stage of the present invention. it is possible to arrange magnet arrays horizontally or combine those based on the layout of the stage and the restriction of the arrangement of the magnet array.

Although examples that change the number of armature units, the number of magnetic poles of each armature unit, the number of turns of the winding and the cross-sectional area thereof were explained in the above-explained embodiments of the present invention, but the present invention is not limited to such examples as long as the same effect can be obtained.

INDUSTRIAL APPLICABILITY

The present invention can be applied to a thrust generation mechanism or a linear motor that utilizes an electromagnetic force, a drive device that utilizes an electromagnetic force, an XY stage and an XYZ stage which use that drive device as a drive source and which are used for a semiconductor manufacturing device and an industrial machine.

DESCRIPTION OF REFERENCE NUMERALS

1 Armature core
3 Magnet array
4 Gap
11, 12 Polar tooth
100 Armature core unit
200 Armature unit
601, 901, 902, 903 Winding
602 Magnetic pole
603 Stator
604 Magnet
606 Upper polar tooth
607 Lower polar tooth
608 Core
610 Armature unit
611 Drive device
612 Magnet array
613, 131 Magnet array fixing stage
614 Base
615 Rail
616 Stage
701 Armature unit (three magnetic poles)
702 Armature unit (two magnetic poles)
703, 703a, 703b Armature unit (four magnetic poles)
711 X-axis drive device
712 Y-axis drive device
713 Z-axis drive device
721 X-axis magnet array
722 Y-axis magnet array
723 Z-axis magnet array
741 Z-axis base
751 Rail stage
801 Position controller
802 Speed controller
803 Current controller
804 Power amplifier
805 Linear scale
806 Phase current referring unit
807 Current value calculator

The invention claimed is:

1. A thrust generation mechanism that comprises an armature and a mover movable relative to each other, the armature including an armature core and a winding and the mover including a permanent magnet, wherein
the armature core comprises polar teeth of the same size and shape are arranged at respective magnetic polarity sides of the permanent magnet directly opposite each other via a gap, and a core that connects the polar teeth, and
the armature includes a plurality of the armature cores and the plurality of the armature cores have a same polarity, wherein the same winding is commonly wound around the plurality of the armature cores,
wherein the drive device comprises a plurality of the armature units with the plurality of magnetic poles having a same polarity, and
a number of magnetic poles, and/or a number of turns of the winding, and/or a cross-sectional area of the winding configuring each of the plurality of armature units is different for each armature unit.

2. The thrust generation mechanism according to claim 1, wherein
the plurality of armature cores have a same polarity with a pitch of the plurality of armature cores being 2nP (n is an integer where n=1, 2, 3, . . . ) when a pitch of magnetic poles of the mover is P.

3. The thrust generation mechanism according to claim 1, wherein
the plurality of armature cores have a same polarity with a pitch of the plurality of armature cores being 2nP±P/2m (n is an integer where n=1, 2, 3, . . . , and m is a number of phases where m=1, 2, 3, . . . ) when a pitch of magnetic poles of the mover is P.

4. The thrust generation mechanism according to claim 1, wherein
respective magnetic fluxes by adjacent armature cores are directed in a same direction.

5. The thrust generation mechanism according to claim 1, wherein a thickness t of the armature core in the mover lengthwise direction is P≤t when a pitch of magnetic poles of the mover is P.

6. The thrust generation mechanism according to claim 1, wherein
the core arranged in a facing manner in the gap having a range of 2P when a pitch of the magnetic poles of the mover is P generates magnetic fluxes in a same direction against an arbitrary current supplied to the winding.

7. The thrust generation mechanism according to claim 1, wherein
a plurality of the armature cores arranged in the gap relative to an arbitrary current supplied to the winding generate magnetic fluxes in a same direction.

8. The thrust generation mechanism according to claim 1, wherein
the number of polarities generated by the armature in the gap against an arbitrary current supplied to the winding is one relative to a magnet array having two polarities with a pitch of the magnetic poles being P.

9. The thrust generation mechanism according to claim 1, wherein armature windings are arranged around the polar teeth arranged at respective magnetic polarity sides of the permanent magnet so as to face each other.

10. The thrust generation mechanism according to claim 1, wherein the polar teeth arranged at respective magnetic polarity sides of the permanent magnet so as to face each other are tapered toward the magnet.

11. The thrust generation mechanism according to claim 1, wherein the polar teeth arranged at respective magnetic polarity sides of the permanent magnet so as to face each other are shaped so that a plane facing the magnet is cut out.

12. The thrust generation mechanism according to claim 1, wherein a unit including a plurality of the armatures is taken as a phase, and the thrust generation mechanism is driven in a plurality of phases, and
a pitch of respective phases that are the plurality of adjacent armatures is set to be (nP+P/m) (where n=0, 1, 2, 3, . . . , and m is a number of phases where m=1, 2, 3, . . . ) when a pitch of the magnetic poles is P.

13. A linear motor comprising the thrust generation mechanism according to claim 1.

14. A drive device that includes an armature unit and a magnet array movable relative to each other, the armature unit including a magnetic pole and a winding and the magnet array including a permanent magnet, wherein
the magnetic pole comprises:
polar teeth of the same size and shape arranged at both sides of the permanent magnet directly opposite each other via a gap; and
a core that connects the polar teeth arranged so as to face each other via the gap, and
the armature unit comprises a plurality of the magnetic poles and the plurality of magnetic poles have a same polarity,
wherein the same winding is commonly wound around the plurality of the armature cores,
wherein he drive device comprises a plurality of the armature units with the plurality of magnetic poles having a same polarity, and
a number of magnetic poles, and/or a number of turns of the winding, and/or a cross-sectional area of the winding configuring each of the plurality of armature units is different for each armature unit.

15. The drive device according to claim 14, wherein
the drive device comprises a plurality of the armature cores with the plurality of magnetic poles having a same polarity, and
the drive device further comprises a closed-loop control system including:
a sensor that detects a relative positions of the magnet array and the armature unit;
a control unit that feeds back a signal output by the sensor; and
a power drive unit that supplies power.

16. The drive device according to claim 15, wherein
a plurality of the power drive units are provided for the plurality of armature units.

17. The drive device according to claim 15, wherein
a control is performed in accordance with currents supplied to the plurality of armature units and a characteristic of a thrust.

18. The drive device according to claim 15, wherein
the drive device further comprises a control system that calculates a current reference using positional information of the magnet array with respect to a thrust reference given to the plurality of armature units.

* * * * *